(12) United States Patent
de Greef

(10) Patent No.: US 9,728,143 B2
(45) Date of Patent: Aug. 8, 2017

(54) SYSTEM AND METHOD FOR DRIVING ELECTROWETTING DISPLAY DEVICE

(71) Applicant: Amazon Technologies, Inc., Seattle, WA (US)

(72) Inventor: Petrus Maria de Greef, Waalre (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 4 days.

(21) Appl. No.: 14/754,532

(22) Filed: Jun. 29, 2015

(65) Prior Publication Data

US 2016/0379573 A1 Dec. 29, 2016

(51) Int. Cl.
| | |
|---|---|
| *G06F 3/038* | (2013.01) |
| *G09G 5/00* | (2006.01) |
| *G02B 26/00* | (2006.01) |
| *G09G 3/34* | (2006.01) |

(52) U.S. Cl.
CPC ........... *G09G 3/348* (2013.01); *G02B 26/005* (2013.01); *G09G 2300/0404* (2013.01); *G09G 2320/066* (2013.01); *G09G 2360/144* (2013.01); *G09G 2360/16* (2013.01); *G09G 2380/14* (2013.01)

(58) Field of Classification Search
None
See application file for complete search history.

(56) References Cited

U.S. PATENT DOCUMENTS

| | | | | |
|---|---|---|---|---|
| 2010/0188022 | A1* | 7/2010 | Gerlach | H05B 37/02 315/312 |
| 2012/0069232 | A1* | 3/2012 | Chui | G02B 26/001 348/333.01 |
| 2012/0256898 | A1 | 10/2012 | Aubert et al. | |
| 2012/0262774 | A1* | 10/2012 | Bae | G02B 26/005 359/290 |
| 2013/0215491 | A1* | 8/2013 | Choi | G02B 26/00 359/290 |

OTHER PUBLICATIONS

Van Dijk et al., 68.3: Gray Scales for Video Applications on Electrowetting Displays, SID 06 Digest, 2006 SID International Symposium, Society for Information Display, vol. XXXVII, 4pgs., May 24, 2005.

(Continued)

*Primary Examiner* — Alexander Eisen
*Assistant Examiner* — Nan-Ying Yang
(74) *Attorney, Agent, or Firm* — Brinks Gilson & Lione

(57) ABSTRACT

A system and method of driving an electrowetting display device including a plurality of sub-pixels are presented. A sub-pixel in the plurality of sub-pixels is determined to be in an open state or a closed state and a target reflectance value is determined for the sub-pixel. For the sub-pixel in the open state, the target reflectance value is determined to be less than a first threshold value, and a reflectance value of the sub-pixel is set to either a minimum reflectance value or the first threshold value. For the sub-pixel in the closed state, the target reflectance value is determined to be less than a second threshold value, and the reflectance of the sub-pixel is set to either the minimum reflectance value or the second threshold value.

20 Claims, 13 Drawing Sheets

(56) References Cited

OTHER PUBLICATIONS

Yung-Hsiang Chiu et al., Accurate-gray-level and quick-response driving methods for high-performance electrowetting displays, Journal of the SID 19/11, $30^{th}$ International Display Research Conference/Latin Display, 8pgs., Nov. 16-19, 2010, published Nov. 11, 2011.
International Search Report and Written Opinion from corresponding International Application No. PCT/US2016/039612, 14 pgs., Oct. 12, 2016.

\* cited by examiner

SYSTEM AND METHOD FOR DRIVING ELECTROWETTING DISPLAY DEVICE

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, enhancing user experience and satisfaction continues to be a priority. Moreover, increased multimedia use imposes high demands on designing, packaging, and fabricating display devices, as content available for mobile use becomes more extensive and device portability continues to be a high priority to the consumer.

An electrowetting display includes an array of pixels individually bordered by pixel walls that retain liquid, such as an opaque oil, for example. Light transmission through each pixel is adjustable by electronically controlling a position of the liquid in the pixel.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
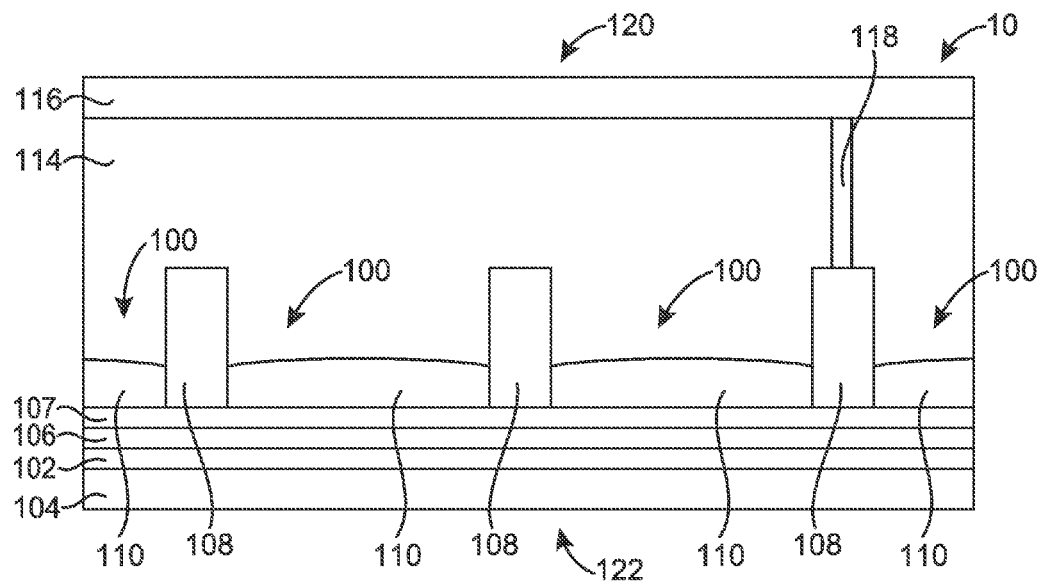
FIGS. 1A and 1B illustrate a cross-section of a portion of an electrowetting display device, according to various embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like.

An electrowetting pixel is defined by a number of pixel walls that surround or are otherwise associated with at least a portion of the electrowetting pixel. The pixel walls form a structure that is configured to contain at least a portion of a first liquid, such as an opaque oil. Light transmission through the electrowetting pixel can be controlled by an application of an electric potential to the electrowetting pixel, which results in a movement of a second liquid, such as an electrolyte solution, into the electrowetting pixel, thereby displacing the first liquid.

When the electrowetting pixel is in a rest state (i.e., with no electric potential applied), the opaque oil is distributed throughout the pixel. The oil absorbs light and the pixel in this conditional appears black. But when the electric potential is applied, the oil is displaced to one side of the pixel. Light can then enter the pixel striking a reflective surface. The light then reflects out of the pixel, causing the pixel to appear white to an observer. If the reflective surface only reflects a portion of the light spectrum or if light filters are incorporated into the pixel structure, the pixel may appear to have color.

The degree to which the oil is displaced from its resting position affects the overall reflectance of the pixel—the pixel's capability to reflect light—and, thereby, the pixel's appearance. In an optimal display device, the driving voltage for a particular pixel results in a predictable reflectance value for that pixel, enabling the overall reflectance of the display device to be precisely and predictably controlled. In real world implementations, however, when a pixel is driven at a particular driving voltage, the resulting reflectance for that pixel depends upon the state of the pixel before the driving voltage was applied. If, for example, the pixel was already open when driven at the driving voltage, the resulting reflectance may be different than if the pixel was closed before the driving voltage was applied.

Accordingly, the oil movement within a pixel exhibits hysteresis, making oil position difficult to accurately predict based upon driving voltage. This attribute of electrowetting display pixels also make reflectance difficult to control, resulting in degradations in overall image quality and/or image artifacts. The disclosed system and methods, therefore, provide electrowetting display pixel driving schemes arranged to minimize or reduce pixel reflectance uncertainty resulting from oil movement hysteresis.

In one embodiment, when setting the reflectance of a pixel to a particular target reflectance, the driving scheme involves a preliminary step, in which the pixel is first driven with a driving voltage putting the pixel in a known condition. With the pixel in the known condition, changes to driving voltage result in known, predictable changes to pixel reflectance and the reflectance of the pixel can confidently be set to the target reflectance. In another embodiment, a display controller utilizes dithering algorithms that avoid setting the reflectance of individual pixels to values that are difficult to predict, while still achieving a target average reflectance level over groups of pixels.

A display device, such as an electrowetting display device, may be a transmissive, reflective or transflective display that generally includes an array of pixels, which comprise a number of sub-pixels, configured to be operated by an active matrix addressing scheme. For example, rows and columns of electrowetting pixels (and their sub-pixels) are operated by controlling voltage levels on a plurality of source lines and gate lines. In this fashion, the display device may produce an image by selecting particular pixels or sub-pixels to transmit, reflect or block light. Sub-pixels are addressed (e.g., selected) via rows and columns of the source lines and the gate lines that are electrically connected to transistors (e.g., used as switches) included in each sub-pixel. The transistors take up a relatively small fraction of the area of each pixel to allow light to efficiently pass through (or reflect from) the display pixel. Herein, a pixel may, unless otherwise specified, be made up of two or more sub-pixels of an electrowetting display device. Such a pixel or sub-pixel may be the smallest light transmissive, reflective or transflective pixel of a display that is individually operable to directly control an amount of light transmission through or reflection from the pixel. For example, in some embodiments, a pixel may comprise a red sub-pixel, a green sub-pixel, and a blue sub-pixel. In other embodiments, a pixel may be a smallest component, e.g., the pixel does not include any sub-pixels. Accordingly, embodiments of the present system may be equally applicable to controlling the state (e.g., reflectance value or driving voltage) of sub-pixels or pixels in various display devices.

Electrowetting displays include an array of pixels and sub-pixels sandwiched between two support plates, such as a bottom support plate and a top support plate. For example, a bottom support plate in cooperation with a top support plate may contain sub-pixels that include electrowetting oil, electrolyte solution and pixel walls between the support plates. Support plates may include glass, plastic (e.g., a transparent thermoplastic such as a poly(methyl methacrylate) (PMMA) or other acrylic), or other transparent material and may be made of a rigid material or a flexible material, for example. Sub-pixels include various layers of materials built upon a bottom support plate. One example layer is an amorphous fluoropolymer (AF) with hydrophobic behavior, around portions of which pixel walls are built.

Hereinafter, example embodiments include, but are not limited to, reflective electrowetting displays that include a clear or transparent top support plate and a bottom support plate, which need not be transparent. The clear top support plate may comprise glass or any of a number of transparent materials, such as transparent plastic, quartz, and semiconductors, for example, and claimed subject matter is not limited in this respect. "Top" and "bottom" as used herein to identify the support plates of an electrowetting display do not necessarily refer to a direction referenced to gravity or to a viewing side of the electrowetting display. Also, as used herein for the sake of convenience of describing example embodiments, the top support plate is that through which viewing of pixels of a (reflective) electrowetting display occurs.

In some embodiments, a reflective electrowetting display comprises an array of pixels and sub-pixels sandwiched between a bottom support plate and a top support plate. The bottom support plate may be opaque while the top support plate is transparent. Herein, describing a pixel, sub-pixel, or material as being "transparent" means that the pixel or material may transmit a relatively large fraction of the light incident upon it. For example, a transparent material or layer may transmit more than 70% or 80% of the light impinging on its surface, though claimed subject matter is not limited in this respect.

Sub-pixel walls retain at least a first fluid which is electrically non-conductive, such as an opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting sub-pixels may include a reflective layer on the bottom support plate of the electrowetting sub-pixel, a transparent electrode layer adjacent to the reflective layer, and a hydrophobic layer on the electrode layer. Pixel walls of each sub-pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue light) in the visible region of electromagnetic radiation. In some embodiments, the opaque liquid is a nonpolar electrowetting oil.

The opaque liquid is disposed in the liquid region. A coverage area of the opaque liquid on the bottom hydrophobic layer is electrically adjustable to affect the amount of light incident on the reflective electrowetting display that reaches the reflective material at the bottom of each pixel.

In addition to pixels, spacers and edge seals may also be located between the two support plates. The support plates may comprise any of a number of materials, such as plastic, glass, quartz, and semiconducting materials, for example, and claimed subject matter is not limited in this respect.

Spacers and edge seals which mechanically connect the first support plate with the second overlying support plate, or which form a separation between the first support plate and the second support plate, contribute to mechanical integrity of the electrowetting display. Edge seals, for example, being disposed along a periphery of an array of electrowetting pixels, may contribute to retaining fluids (e.g., the first and second fluids) between the first support plate and the second overlying support plate. Spacers can be at least partially transparent so as to not hinder throughput of light in the electrowetting display. The transparency of spacers may at least partially depend on the refractive index of the spacer material, which can be similar to or the same as the refractive indices of surrounding media. Spacers may also be chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the display device. For example, display software may include code executable by a processor to modulate optical properties of individual pixels of the electrowetting display based, at least in part, on electronic signals representative of image and/or video data. The code may cause the processor to modulate the optical properties of pixels by controlling electrical signals (e.g., voltages, currents, and fields) on, over, and/or in layers of the electrowetting display.

Figure 1B:
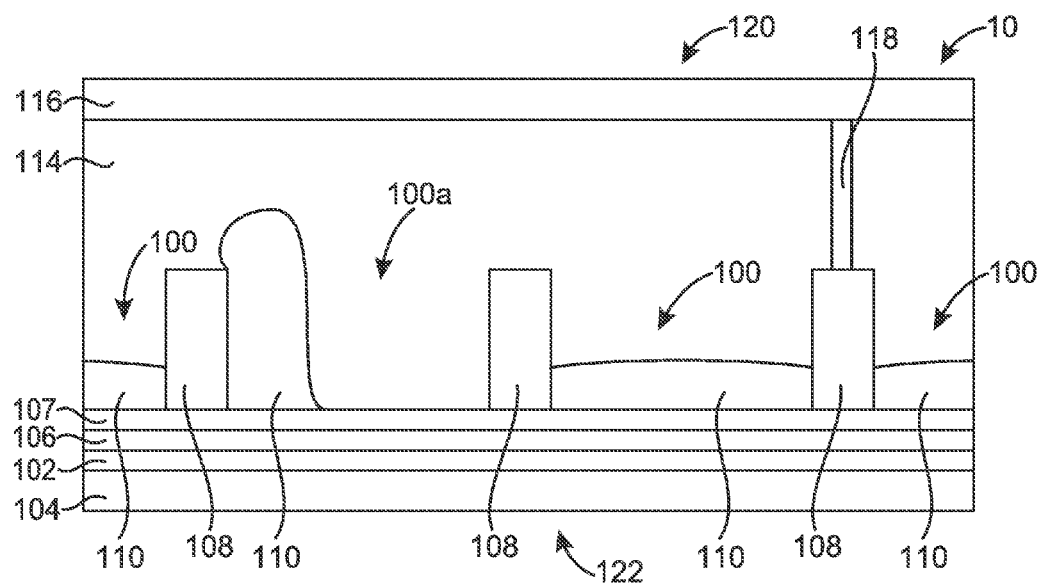
Figure 2:
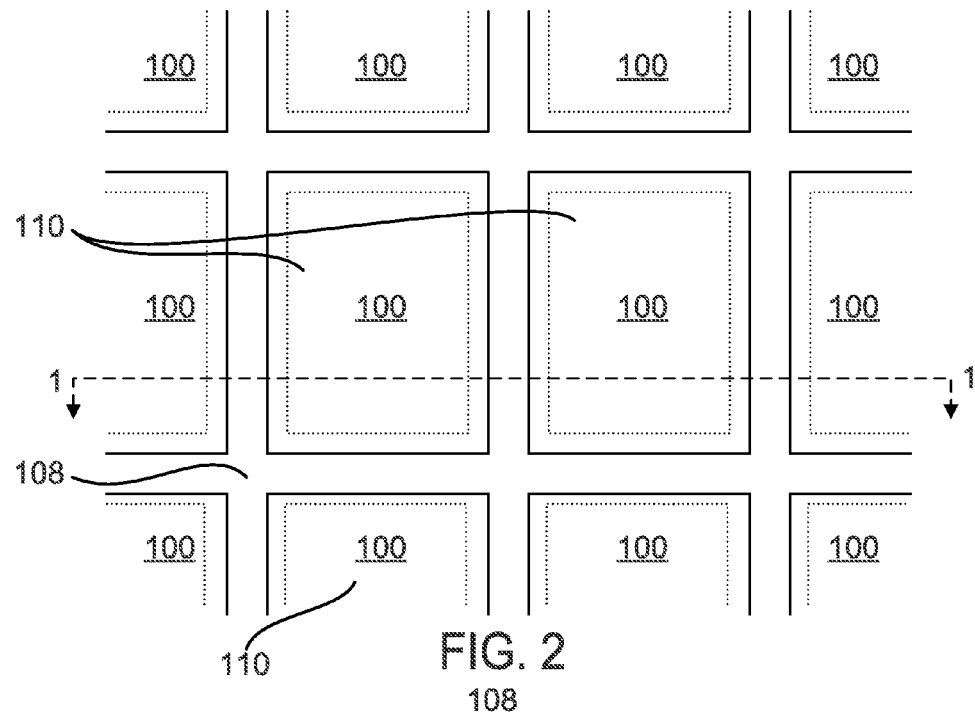
FIG. 2 illustrates a top view of the electrowetting pixels of FIGS. 1A and 1B mostly exposed by an electrowetting fluid, according to various embodiments.

FIG. 1A is a cross-section of a portion of an example reflective electrowetting display device 10 illustrating several electrowetting sub-pixels 100 taken along sectional line 1-1 of FIG. 2. FIG. 1B shows the same cross-sectional view as FIG. 1A in which an electric potential has been applied to one of the electrowetting sub-pixels 100 causing displacement of a first fluid disposed therein, as described below. FIG. 2 shows a top view of electrowetting sub-pixels 100 formed over a bottom support plate 104.

In FIGS. 1A and 1B, two complete electrowetting sub-pixels 100 and two partial electrowetting sub-pixels 100 are illustrated. Electrowetting display device 10 may include any number (usually a very large number, such as thousands or millions) of electrowetting sub-pixels 100. An electrode layer 102 is formed on a bottom support plate 104.

In various embodiments, electrode layer 102 may be connected to any number of transistors, such as thin film transistors (TFTs) (not shown), that are switched to either select or deselect electrowetting sub-pixels 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other suitable transparent or non-transparent materials, for example.

In some embodiments, a dielectric barrier layer 106 may at least partially separate electrode layer 102 from a hydrophobic layer 107, such as an amorphous fluoropolymer layer for example, also formed on bottom support plate 104. Such separation may, among other things, prevent electrolysis occurring through hydrophobic layer 107. Barrier layer 106 may be formed from various materials including organic/inorganic multilayer stacks or silicon dioxide ($SiO_2$) and polyimide layers. When constructed using a combination of $SiO_2$ and polyimide layers, the $SiO_2$ layer may have a thickness of 200 nanometers and a dielectric constant of 3.9, while the polyimide layer may have a thickness of 105 nanometers and a dielectric constant of 2.9. In some embodiments, hydrophobic layer 107 is an amorphous fluoropolymer layer including any suitable fluoropolymer(s), such as AF1600, produced by DuPont, based in Wilmington, Del. Hydrophobic layer 107 may also include suitable materials that affect wettability of an adjacent material, for example.

Sub-pixel walls 108 form a patterned electrowetting pixel grid on hydrophobic layer 107. Sub-pixel walls 108 may comprise a photoresist material such as, for example, epoxy-based negative photoresist SU-8. The patterned electrowetting sub-pixel grid comprises rows and columns that form an array of electrowetting sub-pixels. For example, an electrowetting sub-pixel may have a width and a length in a range of about 50 to 500 micrometers.

A first fluid 110, which may have a thickness (e.g., a depth) in a range of about 1 to 10 micrometers, for example, overlays hydrophobic layer 107. First fluid 110 is partitioned by sub-pixel walls 108 of the patterned electrowetting sub-pixel grid. A second fluid 114, such as an electrolyte solution, overlays first fluid 110 and sub-pixel walls 108 of the patterned electrowetting sub-pixel grid. Second fluid 114 may be electrically conductive and/or polar. For example, second fluid 114 may be, for example, a water solution or a salt solution such as potassium chloride water. First fluid 110 is immiscible with second fluid 114.

A support plate 116 covers second fluid 114 and a spacer 118 to maintain second fluid 114 over the electrowetting sub-pixel array. In one embodiment, spacer 118 extends to support plate 116 and may rest upon a top surface of one or more of the sub-pixel walls 108. In alternative embodiments, spacer 118 does not rest on sub-pixel wall 108 but is substantially aligned with sub-pixel wall 108. This arrangement may allow spacer 118 to come into contact with sub-pixel wall 108 upon a sufficient pressure or force being applied to support plate 116. Multiple spacers 118 may be interspersed throughout the array of sub-pixels 100. Support plate 116 may be made of glass or polymer and may be rigid or flexible, for example. In some embodiments, TFTs are fabricated onto support plate 116.

A voltage applied across, among other things, second fluid 114 and electrode layer 102 of individual electrowetting pixels may control transmittance or reflectance of the individual electrowetting pixels.

The reflective electrowetting display device 10 has a viewing side 120 on which an image formed by the electrowetting display device 10 may be viewed, and an opposing rear side 122. Support plate 116 faces viewing side 120 and bottom support plate 104 faces rear side 122. The reflective electrowetting display device 10 may be a segmented display type in which the image is built of segments. The segments may be switched simultaneously or separately. Each segment includes one electrowetting sub-pixel 100 or a number of electrowetting sub-pixels 100 that may be adjacent or distant from one another. In some cases, adjacent electrowetting sub-pixels 100 may be sub-pixels 100 that are next to one another with no other intervening sub-pixel 100. In other cases, adjacent electrowetting sub-pixels 100 may be sub-pixels 100 that are located in adjacent pixels. Adjacent sub-pixels 100 may be defined as sub-pixels of the same color that are located in adjacent pixels. Electrowetting sub-pixels 100 included in one segment are switched simultaneously, for example. The electrowetting display device 10 may also be an active matrix driven display type or a passive matrix driven display, for example.

As mentioned above, second fluid 114 is immiscible with first fluid 110. Herein, substances are immiscible with one another if the substances do not substantially form a solution. Second fluid 114 is electrically conductive and/or polar, and may be water or a salt solution such as a solution of potassium chloride in a mixture of water and ethyl alcohol, for example. In certain embodiments, second fluid 114 is transparent, but may be colored or absorbing. First fluid 110 is electrically non-conductive and may for instance be an alkane like hexadecane or (silicone) oil.

Hydrophobic layer 107 is arranged on bottom support plate 104 to create an electrowetting surface area. The hydrophobic character of hydrophobic layer 107 causes first fluid 110 to adhere preferentially to hydrophobic layer 107 because first fluid 110 has a higher wettability with respect to the surface of hydrophobic layer 107 than second fluid 114 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 110 absorbs light within at least a portion of the optical spectrum. First fluid 110 may be transmissive for light within a portion of the optical spectrum, forming a color filter. For this purpose, the fluid may be colored by addition of pigment particles or dye, for example. Alternatively, first fluid 110 may be black (e.g., absorbing substantially all light within the optical spectrum) or reflecting. Hydrophobic layer 107 may be transparent or reflective. A reflective layer may reflect light within the entire visible spectrum, making the layer appear white, or reflect a portion of light within the visible spectrum, making the layer have a color.

If a voltage is applied across an electrowetting sub-pixel 100, electrowetting sub-pixel 100 will enter into an active or open state. Electrostatic forces will move second fluid 114 toward electrode layer 102 within the active sub-pixel as hydrophobic layer 107 formed within the active electrowetting sub-pixel 100 becomes hydrophilic, thereby displacing first fluid 110 from that area of hydrophobic layer 107 to sub-pixel walls 108 surrounding the area of hydrophobic layer 107, to a droplet-like form. Such displacing action uncovers first fluid 110 from the surface of hydrophobic layer 107 of electrowetting sub-pixel 100.

FIG. 1B shows one of electrowetting sub-pixels 100 in an active state. With an electric potential applied to electrode layer 102 underneath the activated electrowetting sub-pixel 100, second fluid 114 is attracted towards electrode layer 102 displacing first fluid 110 within the activated electrowetting sub-pixel 100.

As second fluid 114 moves into the activated electrowetting sub-pixel 100, first fluid 110 is displaced and moves towards a sub-pixel wall 108 of the activated sub-pixel 100. In the example of FIG. 1B, first fluid 110 of sub-pixel 100a has formed a droplet as a result of an electric potential being applied to sub-pixel 100a. After activation, when the voltage across electrowetting sub-pixel 100a is returned to an inactive signal level of zero or a value near to zero, electrowetting sub-pixel 100a will return to an inactive or closed state, where first fluid 110 flows back to cover hydrophobic layer 107. In this way, first fluid 110 forms an electrically controllable optical switch within each electrowetting sub-pixel 100.

Figure 3:
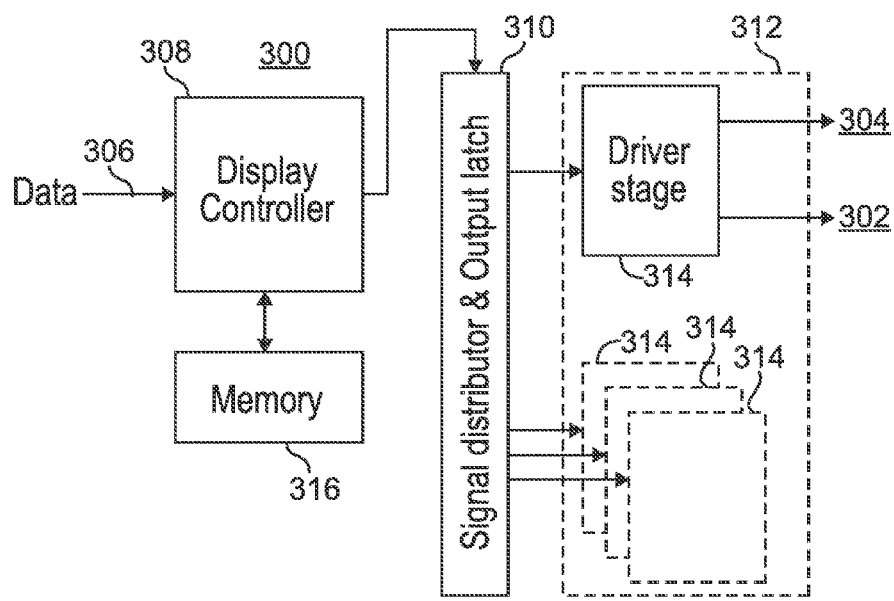
FIG. 3 is a block diagram of an example embodiment of an electrowetting display driving system, including a control system of the electrowetting display device.

FIG. 3 shows a block diagram of an example embodiment of an electrowetting display driving system 300, including a control system of the display device. Display driving system 300 can be of the so-called direct drive type and may be in the form of an integrated circuit adhered to bottom support plate 104. Display driving system 300 includes control logic and switching logic, and is connected to the display by means of electrode signal lines 302 and a common signal line 304. Each electrode signal line 302 connects an output from display driving system 300 to a different electrode within each sub-pixel 100, respectively. Common signal line 304 is connected to second fluid 114 through an electrode. Also included are one or more input data lines 306, whereby display driving system 300 can be instructed with data so as to determine which sub-pixels 100 should be in an active or open state and which sub-pixels 100 should be in an inactive or closed state at any moment of time. In this manner, display driving system 300 can determine a target reflectance value for each sub-pixel 100 within the display. The data specifying the target reflectance value for each sub-pixel 100 may explicitly set forth a particular reflectance value or, in some embodiments, may include data from which a target reflectance value or driving voltage can be determined For example, the data may specify a particular percentage by which a particular sub-pixel should be opened, or a particular driving voltage for the sub-pixel. The data may also specify a particular brightness or color for a sub-pixel or any other data indicating how a particular sub-pixel within the display should appear. Controller 308 can then convert (if necessary) that data into target reflectance values for each sub-pixel. Once a target reflectance value is determined for a particular sub-pixel, controller 308 sets the reflectance value of the sub-pixel to that target reflectance value by converting the reflectance value into a corresponding driving voltage to be subjected to the electrode of the sub-pixel. That driving voltage is then applied to the appropriate electrode signal line 302.

In the present disclosure, the reflectance value of a particular sub-pixel may relate to or provide some indication of the actual reflectance of the sub-pixel. The reflectance value is not necessarily a measure of the sub-pixel's actual reflectance, but is a value that is intended to scale with or relate to the sub-pixel's actual reflectance. The reflectance value may be expressed as a numerical value utilized by display driving system 300 to select an appropriate driving voltage for a sub-pixel. Reflectance values, for example, may include numerical values between 0 and 100, where 0 represents a minimum reflectance of a pixel and 100 represents a maximum reflectance. In other embodiments, such a scale may include more or fewer values. In other cases, the reflectance value may be a numerical value equal to or easily translated into a corresponding driving voltage, such as an actual voltage value, a scaled voltage value, a video level, or other similar values.

In the present disclosure, various embodiments of electrowetting sub-pixel driving schemes are presented that analyze the current state of a sub-pixel, as well as that sub-pixel's current and target reflectance value to make decisions regarding the reflectance value to which the sub-pixel will be set. Given the correlation between reflectance values and driving voltages, it will be apparent that the present embodiments may be implemented so as to instead analyze the current state of a sub-pixel, as well as that sub-pixel's current and target driving voltages to make decisions regarding the driving voltage to which the sub-pixel will be subjected. As such, analysis and comparison of the sub-pixel's current and target reflectance values to various threshold values may be considered equivalent to a similar analysis and comparison of corresponding current and target driving voltages to equivalent driving voltage threshold values.

Electrowetting display driving system 300 as shown in FIG. 3 includes a display controller 308, e.g., a microcontroller, receiving input data from the input data lines 306 relating to the image to be displayed. Display controller 308, being in this embodiment the control system, is configured to apply a voltage to the first electrode to establish a particular display state (i.e., reflectance value) for a sub-pixel 100. The microcontroller controls a timing and/or a signal level of at least one signal level for a sub-pixel 100.

The output of display controller 308 is connected to the data input of a signal distributor and data output latch 310. The signal distributor and data output latch 310 distributes incoming data over a plurality of outputs connected to the display device, via drivers in certain embodiments. The signal distributor and data output latch 310 cause data input indicating that a certain sub-pixel 100 is to be set in a specific display state to be sent to the output connected to sub-pixel 100. The distributor and data output latch 310 may be a shift register. The input data is clocked into the shift register and at receipt of a latch pulse the content of the shift register is copied to the distributor and data output latch 310. The distributor and data output latch 310 has one or more outputs, connected to a driver assembly 312. The outputs of the distributor and data output latch 310 are connected to the inputs of one or more driver stages 314 within the electrowetting display driving system 300. The outputs of each driver stage 314 are connected through electrode signal lines 302 and common signal line 304 to a corresponding sub-pixel 100. In response to the input data, a driver stage 314 will output a voltage of the signal level set by display controller 308 to set one of sub-pixels 100 to a corresponding display state having a target reflectance level.

To assist in setting a particular sub-pixel to a target reflectance level, memory 316 may also store data that maps a particular driving voltage for a sub-pixel to a corresponding reflectance value and vice versa. The data may be stored as one or more curves depicting the relationship between driving voltage and reflectance value, or a number of discrete data points that map a driving voltage to a reflectance value and vice versa. As such, when display controller 308 identifies a target reflectance value for a particular sub-pixel, display controller 308 can use the data mapping driving voltage to reflectance value to identify a corresponding driving voltage. The sub-pixel can then be driven with that driving voltage.

As described below, however, the relationship between a sub-pixel's reflectance value and the sub-pixel's driving voltage can depend upon the current state of the sub-pixel—whether the pixel is in an open state (transitioning from open-to-closed) or in a closed state (transitioning from closed-to-open). As such, memory 316 may store two sets of data that map particular reflectance values to driving voltages for sub-pixels in both open and closed states for various ranges of driving voltage. The data may be stored or represented in memory 316 in any suitable manner including curvilinear functions or a series of discrete data points that relate different reflectance values to particular driving voltages for sub-pixels in open and closed states. Using the data, display controller 308 can then translate a particular target reflectance value for a sub-pixel to a corresponding driving voltage based upon the sub-pixel's current state.

As described below, display controller 308 may include or be connected to memory 316 configured to store a status of one or more sub-pixels 100 in the display device. For example, memory 316 may store an indication of whether a particular sub-pixel 100 is currently in an open or closed state. As display controller 308 causes the state of a particular sub-pixel 100 to change (e.g., by opening a previously-closed state sub-pixel or closing a previously-open state sub-pixel), display controller 308 can update one or more entries in memory 316 to indicate the sub-pixel's current state. Because, for a given driving voltage, a sub-pixel's reflectance can depend upon the prior state of the sub-pixel (e.g., whether the sub-pixel was in an open or closed state before being driven at the given driving voltage), the sub-pixel state data stored in memory 316 can be utilized, as described herein, to more accurately control sub-pixel reflectance.

The sub-pixel state data may be stored within memory 316 in any suitable fashion. For example, within memory 316, a flag may be set for each sub-pixel within the display device indicating whether the sub-pixel is currently in an open state or a closed state. Alternatively, the sub-pixel state data may be stored in a bitmap, where the bitmap is a two-dimensional array of bits having a number of bits equal to the number of sub-pixels in the display. Each bit represents a particular sub-pixel and can then be toggled between different values (e.g., '0' and '1') to indicate the current state of a corresponding sub-pixel (e.g., where a value of '0' represents the pixel being in a closed state and a value of '1' represents the pixel being in an open state).

Figure 4:
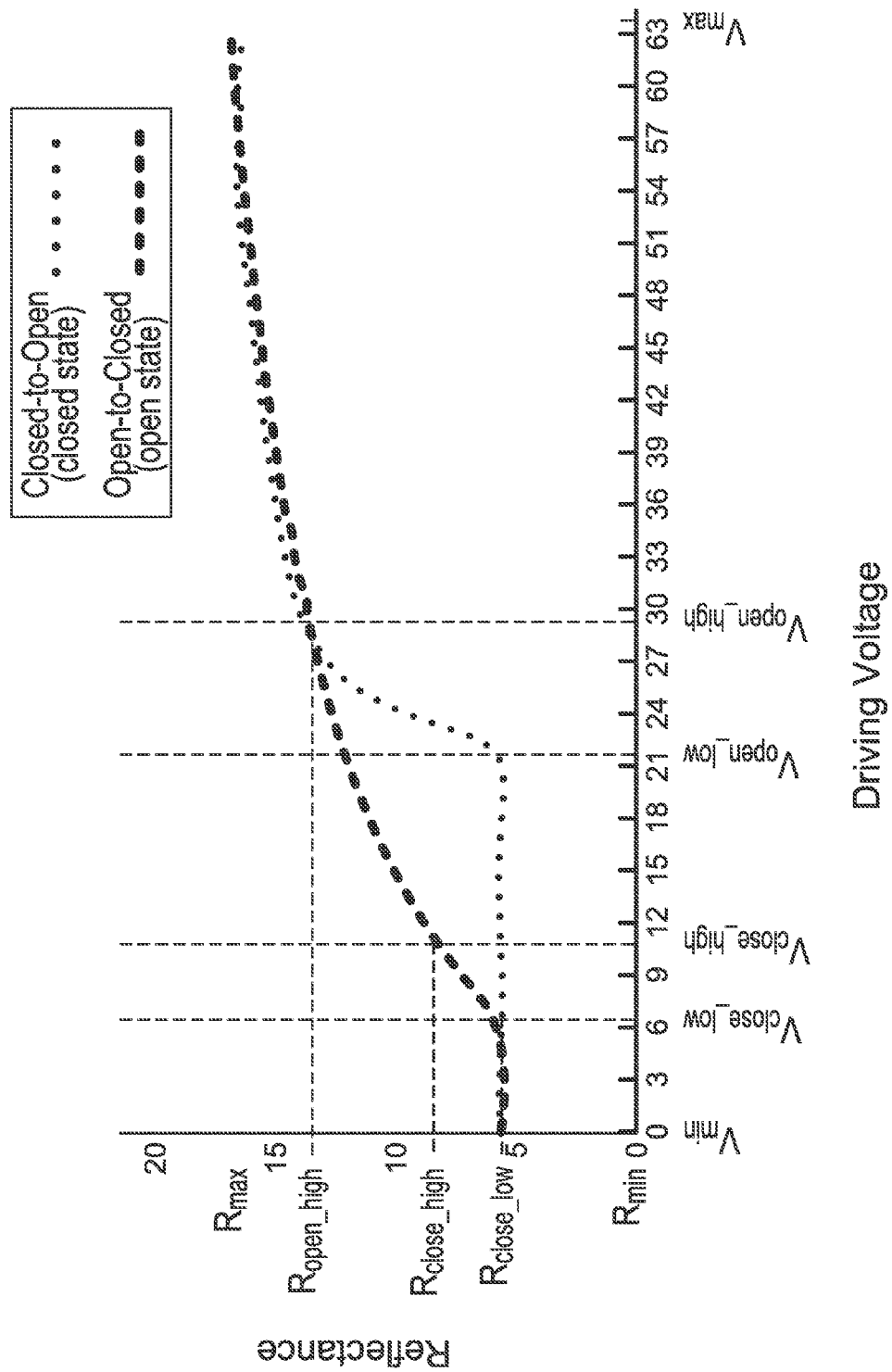
FIG. 4 is a graph illustrating a reflectance hysteresis effect for an average sub-pixel within an electrowetting display device.

The dependency of a sub-pixel's reflectance on the prior state of the sub-pixel is referred to as hysteresis. FIG. 4 is a graph illustrating this hysteresis effect for an average sub-pixel within a display. In the graph, the horizontal axis represents a sub-pixel's driving voltage, while the vertical axis represents the sub-pixel's actual reflectance. The graph shows two curves. The first rising curve shows the average sub-pixel's reflectance versus voltage when the sub-pixel is transitioned from a closed state to an open state. The falling curve shows the average sub-pixel's reflectance versus voltage when the sub-pixel is transitioned from an open state to a closed state. As shown by the graph, the sub-pixel's reflectance value shows relatively significant hysteresis spanning 25% of the driving voltage range and 60% of the reflectance range.

Starting with a low driving voltage $V_{min}$ and a group of closed-state sub-pixels, their average reflectance has a corresponding minimum value $R_{min}$. These sub-pixels, being driven at a low driving voltage have been forced closed and are, consequently in a closed state. As the driving voltage increases, the reflectance of those pixels will move along the closed-to-open curve. Accordingly, being in a closed-state does not necessarily mean that a sub-pixel is fully closed. In fact, a sub-pixel that is in a closed state could be partially open as its reflectance state moves along the closed-to-open curve, as shown in FIG. 4.

When the driving voltage increases beyond $V_{open\_low}$ the average reflectance of the closed-state sub-pixels gradually starts to increase, as some individual sub-pixels begin opening to a reflection level close to $R_{open\_high}$, while others remain closed at the reflectance level $R_{close\_low}$ (e.g., a minimum reflectance level). In the mid point between $V_{open\_low}$ and $V_{open\_high}$ the reflectivity increases faster, as more sub-pixels begin opening. When reaching the voltage level $V_{open\_high}$, all sub-pixels have a high probability (e.g., greater than 95%) of being open. While each open sub-pixel has a reflectance of $R_{open\_high}$, the average reflectance of these pixels is also $R_{open\_high}$. When increasing the driving voltage towards $V_{max}$ the sub-pixel reflectance increases to $R_{max}$.

When the driving voltage for a sub-pixel reaches or exceeds $V_{open\_high}$, the closed-state sub-pixels have been forced open and enter an open state. Once the sub-pixels have entered the open state, variations in the driving voltage of the open-state sub-pixels will cause the reflectance of those sub-pixels to move along the open-to-closed curve of FIG. 4. As such, a sub-pixel that is in an open state is not necessary 100% open. As illustrated by FIG. 4, as the driving voltage of an open-state sub-pixel is varied, the reflectance of the open-state sub-pixel travels along the open-to-closed curve and, as such, the reflectance and the degree to which the sub-pixel is open, will vary.

In the present disclosure, $R_{open\_high}$ refers to a lowest reflectance level above which a closed-state sub-pixel transitions to an open-state sub-pixel from a closed-state sub-pixel. $R_{open\_high}$, therefore, is a reflectance level corresponding to a driving voltage level above which a closed sub-pixel has a high probability (e.g., greater than 95%) of opening when driven to this driving voltage for at least one addressing cycle. In the present disclosure, an addressing cycle may refer to a single operating cycle of display controller 308 analyzing data 306 to determine a target reflectance value for a sub-pixel, converting that target reflectance value to a corresponding driving voltage (if necessary), and subjecting the sub-pixel to that driving voltage until controller 308 again reads data 306 to determine a new reflectance value. As such, the addressing cycle may occur ever time new data is retrieved from data 306 by display controller 308. Consequently, the addressing cycle may be equal to the minimum amount of time between a sub-pixel being set to a first reflectance value and the sub-pixel being set to a second reflectance value. The duration of an addressing cycle may change based upon the operation of display driving system 300 and so may not be a fixed period of time, but in various embodiments could be approximately ⅟₆₀ of a second.

In the present disclosure, $R_{close\_high}$ refers to a lowest reflectance above which an open state sub-pixel will remain open before closing to a minimum reflectance value. Or, alternatively, a highest reflectance below which an open sub-pixel will close. $R_{close\_high}$, therefore, is a lowest reflectance corresponding to a lowest driving voltage level above which an open sub-pixel has a high probability (e.g., greater than 95%) of remaining open.

When a group of sub-pixels is transitioning from closed to opened, for driving voltages between $V_{open\_low}$ and $V_{open\_high}$, the actual reflectance of a particular sub-pixel cannot be predicted with confidence, as the moment of actual opening, corresponding to the actual driving voltage, has a statistical variation.

Conversely, when starting with a high driving voltage $V_{max}$, the average sub-pixel reflectance has a maximum value $R_{max}$ as all the sub-pixels are fully open. For driving voltages above $V_{close\_high}$ the reflectance of the sub-pixels is relative linear.

But when the driving voltage decreases below $V_{close\_high}$ along the open-to-closed curve, the average reflectance gradually starts to decrease faster, as some individual sub-pixels are closing to the reflection level $R_{close\_low}$, while others remain opened at the reflectance level close to $R_{close\_high}$. In the mid point between $V_{close\_low}$ and $V_{close\_high}$ the reflectivity decreases more rapidly, as more sub-pixels begin closing. When reaching the voltage level $V_{close\_low}$ all sub-pixels are closed. While each sub-pixel has a reflectance of $R_{close\_low}$, the average reflectance of these pixels is also $R_{close\_low}$. For driving opened sub-pixels with voltages above $V_{close\_high}$, the sub-pixel's reflectance is known and predictable. Similarly, for driving voltages below $V_{close\_low}$, the sub-pixel is known to be closed and with minimum reflectance $R_{min}=R_{close\_low}$. When a group of sub-pixels is transitioning from opened to closed, for driving voltages between $V_{close\_low}$ and $V_{close\_high}$, the state of a particular sub-pixel cannot be known with confidence, as the moment of opening, corresponding to the actual driving voltage, has a statistical variation.

Accordingly, for driving voltage values between $V_{close\_low}$ and $V_{close\_high}$, in the case of a sub-pixel transitioning from open-to-closed (i.e., a sub-pixel in an open state), and for driving voltage values between $V_{open\_low}$ and $V_{open\_high}$, in the case of a sub-pixel transitioning from closed-to-open (i.e., a sub-pixel in a closed state), the particular sub-pixel reflectance cannot be confidently predicted.

Due to this hysteresis effect—the difference between the rising and falling voltage-reflectance curves—and the uncertain sub-pixel opening and closing characteristics, given a particular initial state of a sub-pixel (e.g., closed state or open state) there are certain reflectance levels that cannot be reliably achieved should the sub-pixel simply be driven at a driving voltage corresponding to the target reflectance level.

To provide for the predictable achievement of a target reflectance level for a particular sub-pixel, therefore, the method disclosed herein provides for first driving a sub-pixel with a particular driving voltage configured to place the sub-pixel in a condition from which the target reflectance can be reliably achieved.

In one embodiment, all sub-pixels in a display may be first driven to their fully-open condition (e.g., at a driving voltage greater then or equal to $V_{open\_high}$). This causes all sub-pixels to have an initial state of open (though in a real-world implementation sometimes fewer than all sub-pixels (e.g., 95%) will in fact be open at that driving voltage). Then, after all sub-pixels have been opened, the driving voltage applied to any of the sub-pixels of a display device is offset so that the minimum driving voltage is $V_{close\_high}$. This ensures that all sub-pixels in the display device are always operating in an at least partially-opened condition. By restricting the driving voltage in this manner, all sub-pixels will operate along the open-to-closed curve shown in FIG. 4, enabling predictable control over each sub-pixel's reflectance.

When using the approach, however, there are some deficiencies. For example, because the sub-pixels will always be operating in a somewhat open condition, some light will leak through the sub-pixels. This can result in an increase in overall black level for the display from $R_{close\_low}$ to $R_{close\_high}$, reducing the contrast ratio for the display from approximately 1:3.3 to 1:2, for example. The overall black level of the display could be reduced by covering the portion of the sub-pixels that are always open with a light-absorbing material. But such an approach could result in the overall brightness of the display being similarly reduced, again reducing the overall contrast ratio.

An alternative method, therefore, enables the setting of a sub-pixel's reflectance in a predictable manner, but without negatively affecting the display's overall contrast ratio. When setting the reflectance for a given sub-pixel, the method first determines the sub-pixel's current state (e.g., closed state or open state). Based upon the sub-pixel's current state as well as the target reflectance value for the sub-pixel, the method adjusts the sub-pixel's reflectance value either directly to the target reflectance value when the reflectance can be predictably set or through an intermediate reflectance value setting to enable the reflectance to be predictably set.

For example, with reference to FIG. 4, if a given sub-pixel is in an open state (e.g., the sub-pixel's reflectance was recently greater than $R_{open\_high}$), the sub-pixel can be reliably driven to any target reflectance value. As such, even if the target reflectance value is less than $R_{open\_low}$, for example, the sub-pixel can simply be driven with a driving voltage corresponding to that target reflectance value.

If, however, the sub-pixel is in a closed state (i.e., the sub-pixel's reflectance was recently less than $R_{close\_low}$), the sub-pixel cannot be reliably driven to a reflectance value below $R_{open\_high}$. This is because a sub-pixel operating on the closed-to-open curve of FIG. 4 (e.g., a sub-pixel with an initial starting state of closed) will exhibit uncontrolled or unpredictable opening at reflectance values below $R_{open\_high}$. To mitigate this problem, the disclosed method first sets the reflectance value of the sub-pixel to an intermediate level that allows for the reflectance of the sub-pixel to be reliably set to levels below $R_{open\_high}$.

Figure 5:
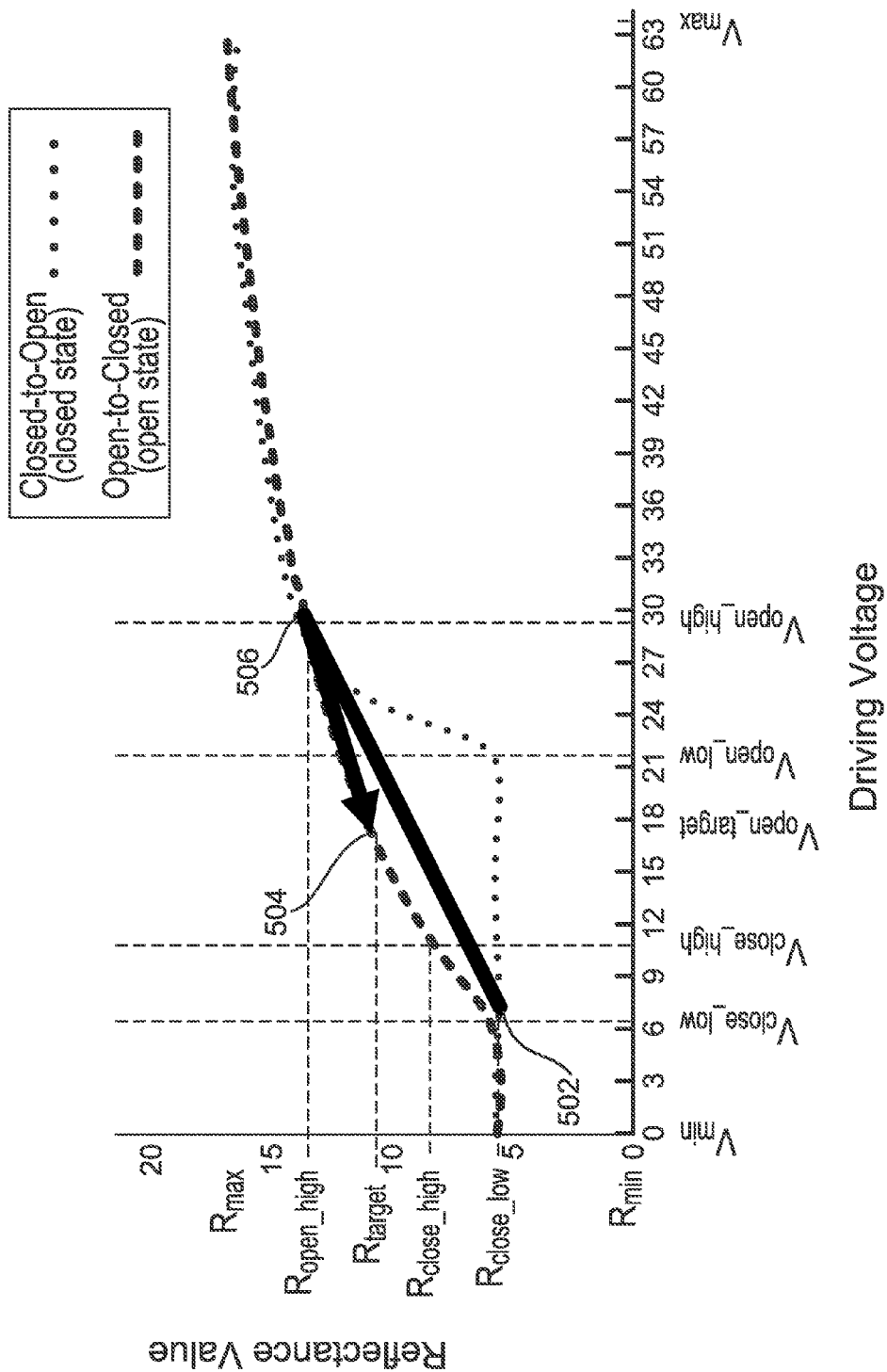
FIG. 5 depicts graphically a method for predictably setting the reflectance of an electrowetting sub-pixel.

The approach is illustrated in FIG. 5. In FIG. 5, the horizontal axis represents driving voltage, while the vertical axis represents the reflectance value of the sub-pixel. Accordingly, FIG. 5 depicts the mapping between a particular reflectance value for a sub-pixel and the corresponding driving voltage based upon the sub-pixel's current state. As discussed above, reflectance values depicted on the vertical axis will correspond, generally, to the actual reflectance of a sub-pixel set to that reflectance value.

Referring to FIG. 5, a closed-state sub-pixel with an initial starting reflectance value of approximately $R_{close\_low}$ (see point 502) is to be set to a target reflectance value $R_{target}$ between $R_{close\_high}$ and $R_{open\_high}$ (see point 504). As described above, if the sub-pixel were to be driven straight from $V_{close\_low}$ (point 502) to $V_{target}$ (point 504), the sub-pixel's opening behavior would move along the closed-to-open curve, resulting in a reflectance of $R_{min}$. Accordingly, before setting the sub-pixel's reflectance value to $R_{target}$ at point 504, the sub-pixel's reflectance value is set to a value greater than or equal to $R_{open\_high}$ with a corresponding driving voltage greater than or equal to $V_{open\_high}$ (see point 506). By driving the sub-pixel's reflectance value to this value, the sub-pixel will be set to an open state. The sub-pixel's reflectance value can then be set to the target value $R_{target}$, with a corresponding driving voltage of $V_{target}$ (point 504) with the sub-pixel's reflectance behavior transitioning along the open-to-closed curve, resulting in the sub-pixel's reflectance being reliably set at point 504.

Figure 6:
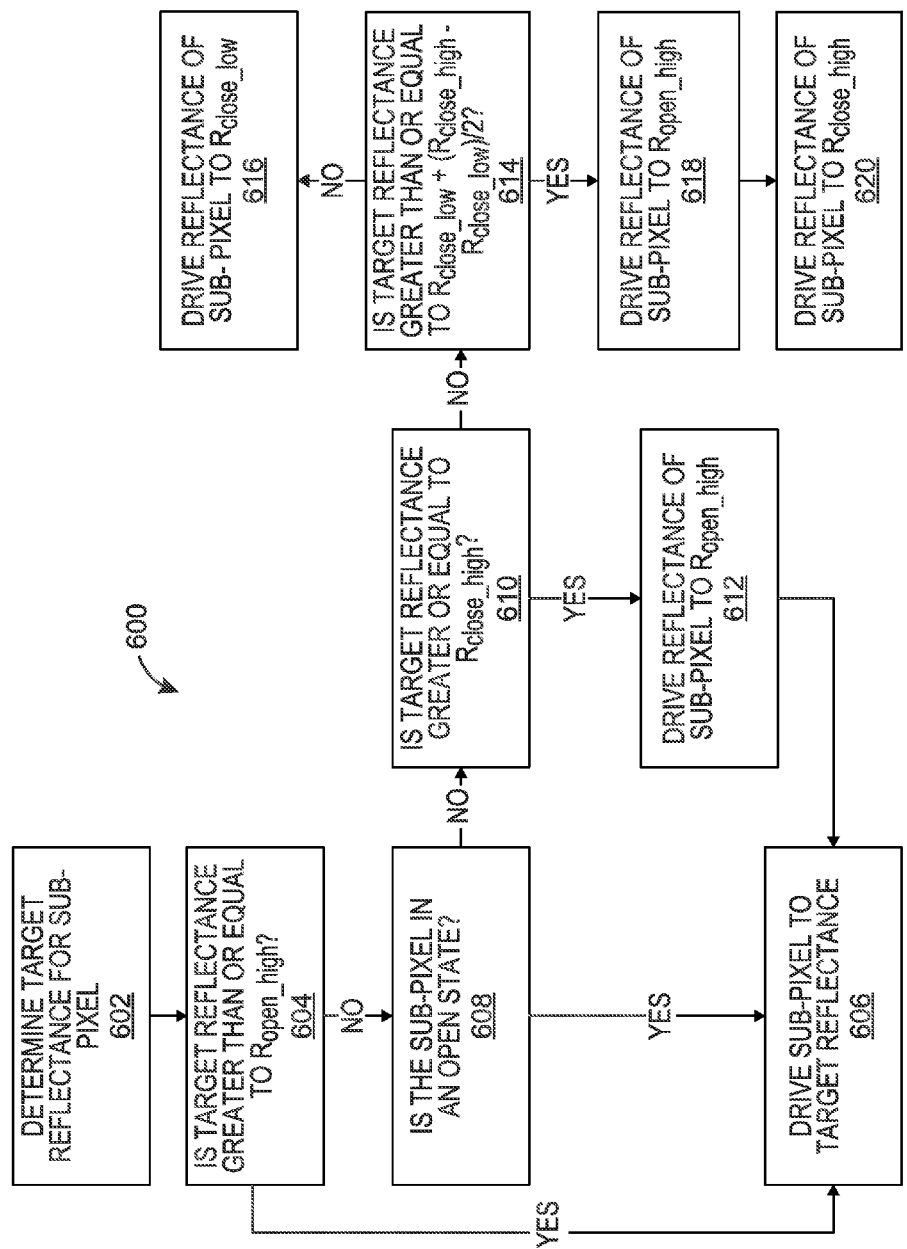
FIG. 6 is a flowchart illustrating steps of an example method for setting the reflectance of a sub-pixel in a display device.

FIG. 6 is a flowchart illustrating the steps of an example method 600 for setting the reflectance of a sub-pixel in a display device corresponding to the illustration shown in FIG. 5. The method 600 illustrated in FIG. 6 may be executed by a display controller (e.g., display controller 308) of the display device. The display controller may be configured to process incoming graphical data to determine target reflectance values for a number of sub-pixels within the display device. Then, for each sub-pixel in the display, the display controller can implement the method illustrated in FIG. 6 to achieve the target reflectance value for each sub-pixel in the display.

In general, the example method 600 of FIG. 6 enables the reflectance of a closed sub-pixel to be predictably set to a value less than $R_{open\_high}$. Accordingly, in some embodiments, the method is only utilized to set the reflectance value of a pixel that is in a closed state.

Referring to FIG. 6, in step 602 the display controller determines a target reflectance value for a particular sub-pixel within the display. As described above, the target reflectance value can be determined by any suitable method and may involve the analysis of video or other graphical data transmitted to the display controller.

In step 604, the display controller determines whether the target reflectance value is greater than or equal to $R_{open\_high}$. If so, the sub-pixel can be predictably driven to that reflectance value regardless of the pixel's initial state. As such, in step 606 the reflectance value of the sub-pixel is set to the target reflectance value.

If, however, the target reflectance value is less than $R_{open\_high}$, the display controller, in step 608, determines whether the sub-pixel is in an open state. This may involve the display controller accessing a memory storing sub-pixel state information to determine the current open or closed state of the sub-pixel. For example, the controller may be configured to utilize a memory (e.g., memory 316 of FIG. 3) in which to store a current state of each sub-pixel in the display. Alternatively, in step 608 the controller may determine whether the current reflectance value of the sub-pixel is greater than or equal to $R_{close\_high}$, which would indicate that the sub-pixel is in an open state.

If the sub-pixel is in an open state, the reflectance value of the sub-pixel can be set to values less than $R_{open\_high}$ because when the sub-pixel is driven with a driving voltage corresponding to the reflectance value, the sub-pixel will be operating along the open-to-closed curve shown in FIG. 4. Accordingly, method 600 moves to step 606 in which the reflectance value of the sub-pixel is set to the target reflectance value with an appropriate driving voltage.

If, however, in step 608 it is determined that the sub-pixel is not in an open state, the reflectance of the sub-pixel cannot be reliably set to reflectance values less than $R_{open\_high}$. Accordingly, in step 610, the controller determines whether the target reflectance value is greater than or equal to $R_{close\_high}$. If so, in step 612 the reflectance value of the sub-pixel is set to a value greater than or equal to $R_{open\_high}$.

Step 612 may set the reflectance value of the sub-pixel to the value greater than $R_{open\_high}$ for at least a single address cycle (e.g., approximately 1/60 second) and ensures that the sub-pixel is in an open state prior to being set to the target reflectance value. This causes the sub-pixel to operate along the open-to-closed curve of FIG. 4 enabling a predictable setting of reflectance. After the sub-pixel has been set into the open state as a result of step 612, in step 606 the reflectance value of the sub-pixel is set to the target reflectance value.

If, however, the target reflectance value is less than $R_{close\_high}$, the target reflectance value cannot be accurately set because, as discussed above, the closing and opening behaviors or sub-pixels are difficult to predict at reflectance values between $R_{close\_low}$ and $R_{close\_high}$. Accordingly, in method 600, if the target reflectance value falls between $R_{close\_low}$ and $R_{close\_high}$, the reflectance value of the sub-pixel will instead be set to a different, predictable value of either $R_{close\_low}$ or $R_{close\_high}$.

Accordingly, in step 614 the controller determines whether the target reflectance value is closer to $R_{close\_low}$ or $R_{close\_high}$. If closer to $R_{close\_low}$ (i.e., the target reflectance value is less than $R_{close\_low}+(R_{close\_high}-R_{close\_low})/2$), the reflectance value of the sub-pixel is set to a minimum value of $R_{close\_low}$ in step 616.

In contrast, if the target reflectance value is closer to $R_{close\_high}$ (i.e., the target reflectance value is greater than or equal to $R_{close\_low}+(R_{close\_high}-R_{close\_low})/2$), the sub-pixel's reflectance value is first set to a value greater than or equal to $R_{open\_high}$ in step 618 before being set to $R_{close\_high}$ in step 620. As in the case of step 612, the sub-pixel may be set to a value greater than or equal to $R_{open\_high}$ for a single address cycle.

In this embodiment, because the sub-pixel could spend a period of time at a reflectance value greater than the target reflectance value, the display could exhibit periods of time with too much overall reflectance. For example, should a large number sub-pixels in a particular region of the display be driven according method 600 shown in FIG. 6 to temporary high reflectance values compared to their target reflectance values, the display could develop bright-spot artifacts. As such, the display controller may be configured to undertake certain steps to prevent too much reflectance being generated within regions or areas of the display.

In one embodiment, the display controller is configured to impose spatial limitations on the sub-pixels being driven to excessive reflectance values. This may involve, for example, defining a number of different regions covering the display and, within each region, limiting the number of sub-pixels driven to reflectance values greater than the target reflectance value to a particular threshold number. In certain circumstances (e.g., scene-changes within a video, or large changes in output that affect nearly all sub-pixels within the display), this restriction could be relaxed so that any number of sub-pixels within the display could be driven to reflectance values greater than their target reflectance values.

Figure 7:
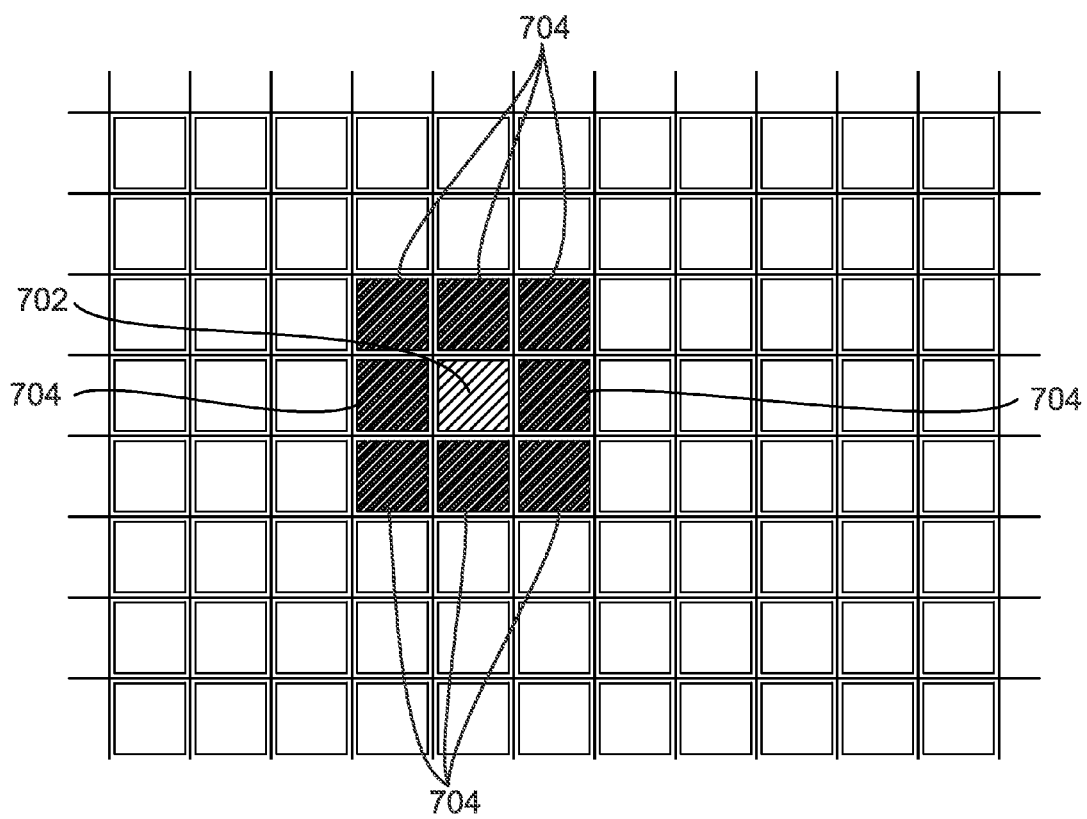
FIG. 7 depicts a plurality of different sub-pixels that may be part of a display.

In another embodiment, the display controller may be configured to compensate for the excessive reflectance of one sub-pixel by temporarily reducing the reflectance values of a number of other (e.g., adjacent) sub-pixels. For example, FIG. 7 depicts a number of different sub-pixels that may be part of a display. In this example, the reflectance value of sub-pixel 702 is being determined according to method 600 of FIG. 6. To provide that the reflectance value of sub-pixel 702 can be reliably set to a target reflectance value that is below $R_{open\_high}$, sub-pixel 702 is first set to a reflectance value above $R_{open\_high}$. This can result in sub-pixel 702 temporarily having too much reflectance (i.e., a reflectance value greater that the target reflectance value). To compensate for the additional undesired reflectance of sub-pixel 702, the display controller may temporarily reduce the reflectance value of one or more adjacent sub-pixels 704.

In one embodiment, the display controller can determine the amount of additional unwanted reflectance by determining the difference between the target reflectance value for sub pixel 702 and $R_{open\_high}$ (i.e., the overdriven reflectance value of sub-pixel 702). The display controller can then divide that additional reflectance amount by the number of adjacent sub-pixels 704 and then reduce the reflectance value of each adjacent sub-pixel 704 by the result. In that case, the sum of the reductions in reflectance values over the adjacent sub-pixels 704 will offset the additional reflectance value of sub-pixel 702 while sub-pixel 702 is temporarily overdriven. The reflectance value of adjacent sub-pixels 704 may only be reduced for the period of time during which sub-pixel 702 is overdriven or may be reduced for some other amount of time. After sub-pixel 702 is set to the target reflectance value, adjacent sub-pixels 704 could be returned to their original reflectance values.

In some instances, if this approach were to close one of the adjacent sub-pixels 704, it could be difficult to re-set that adjacent sub-pixel 704 to its original reflectance due to the hysteresis effects. Accordingly, in other embodiments, the display controller may only reduce the reflectance values for adjacent sub-pixels 704 that will not be closed if their reflectance value should be reduced.

As discussed above, when a sub-pixel is operating along the open-to-closed curve of FIG. 4 (e.g., the sub-pixel is in an open state), the sub-pixel exhibits unpredictable closing characteristics at driving voltages between $V_{close\_low}$ and $V_{close\_high}$. Accordingly, the sub-pixel's driving regime may be configured to avoid reflectance values that correspond to driving voltages between $V_{close\_low}$ and $V_{close\_high}$ as those driving voltages result in unpredictable reflectance.

When avoiding driving open sub-pixels at voltages between $V_{close\_low}$ and $V_{close\_high}$, the individual sub-pixels will not exhibit reflectances between $R_{close\_low}$ and $R_{close\_high}$. To mitigate this reduction in the range of reflectances of individual sub-pixels, the display controller may implement a dithering approach that relies upon the average reflectance of a group of sub-pixels to achieve particular target reflectance values. In other words, the display controller may combine a number of sub-pixels with reflectance values of $R_{close\_low}$ with another number of pixels with reflectance values of $R_{close\_high}$ to achieve a target average reflectance for the group of sub-pixels. The average reflectance of the sub-pixels will be observed by a human spectator because the human visual system tends to apply both spatial and temporal filtering to collections of pixels and may be at levels between $R_{close\_low}$ and $R_{close\_high}$.

Figure 8:
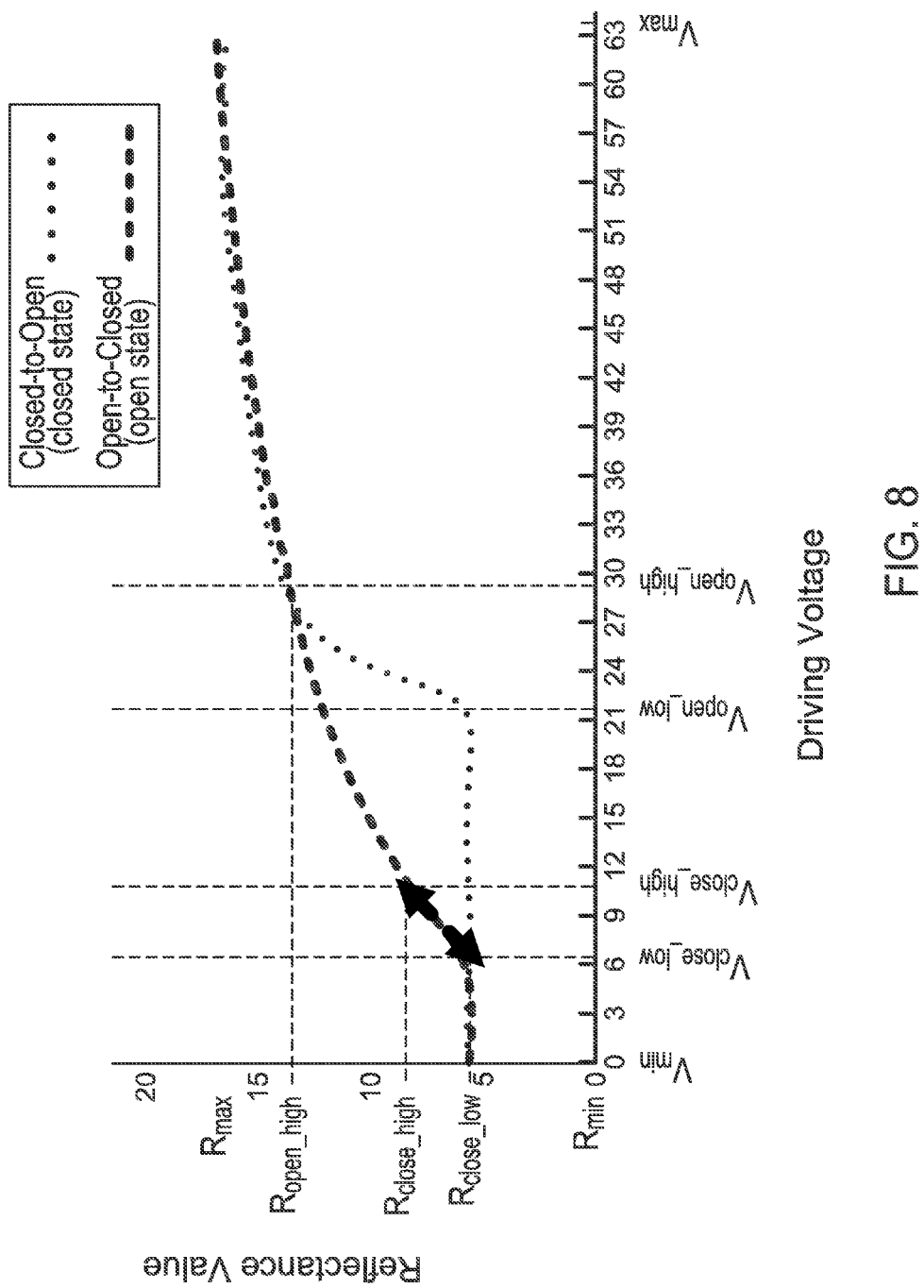
FIG. 8 depicts graphically an example method for dithering reflectance values for an open electrowetting sub-pixel.

The dithering approach is depicted in FIG. 8. In FIG. 8, the horizontal axis represents driving voltage, while the vertical axis represents the reflectance value of the sub-pixel. Accordingly, FIG. 8 depicts the mapping between a particular reflectance value for a sub-pixel and the corresponding driving voltage based upon the sub-pixel's current state. As discussed above, reflectance values depicted on the vertical axis will correspond, generally, to the actual reflectance of a sub-pixel set to that reflectance value.

Referring to FIG. 8, for a sub-pixel operating along the open-to-closed curve (i.e., a sub-pixel that is in an open state), the sub-pixel can be reliably driven to any reflectance value along the curve, with the exception of reflectance values between $R_{close\_low}$ and $R_{close\_high}$. For those reflectance values, the sub-pixel will instead be driven to the nearest reflectance value that results in a predictable reflectance that falls outside those levels. This will result in an error in that sub-pixel's reflectance from the target reflectance value. To compensate, the reflectance values of surrounding sub-pixels are adjusted either slightly higher or lower, as needed, to offset the error.

In one embodiment, a specific dithering approach, such as Floyd-Steinberg dithering, may be utilized to implement this reflectance dithering. In this embodiment, error diffusion may be utilized to distribute the reflectance error resulting from the reflectance value dithering of a single sub-pixel to other sub-pixels within the display to achieve a target average reflectance level. In some embodiments, the reflectance error is only distributed to other sub-pixels of the same color. The accumulated error resulting from this reflectance value dithering can be referred to as quantization error as it results from the quantization of a reflectance value of a sub-pixel from a value between $R_{close\_low}$ and $R_{close\_high}$ to the specific values of either $R_{close\_low}$ or $R_{close\_high}$.

Figure 9:
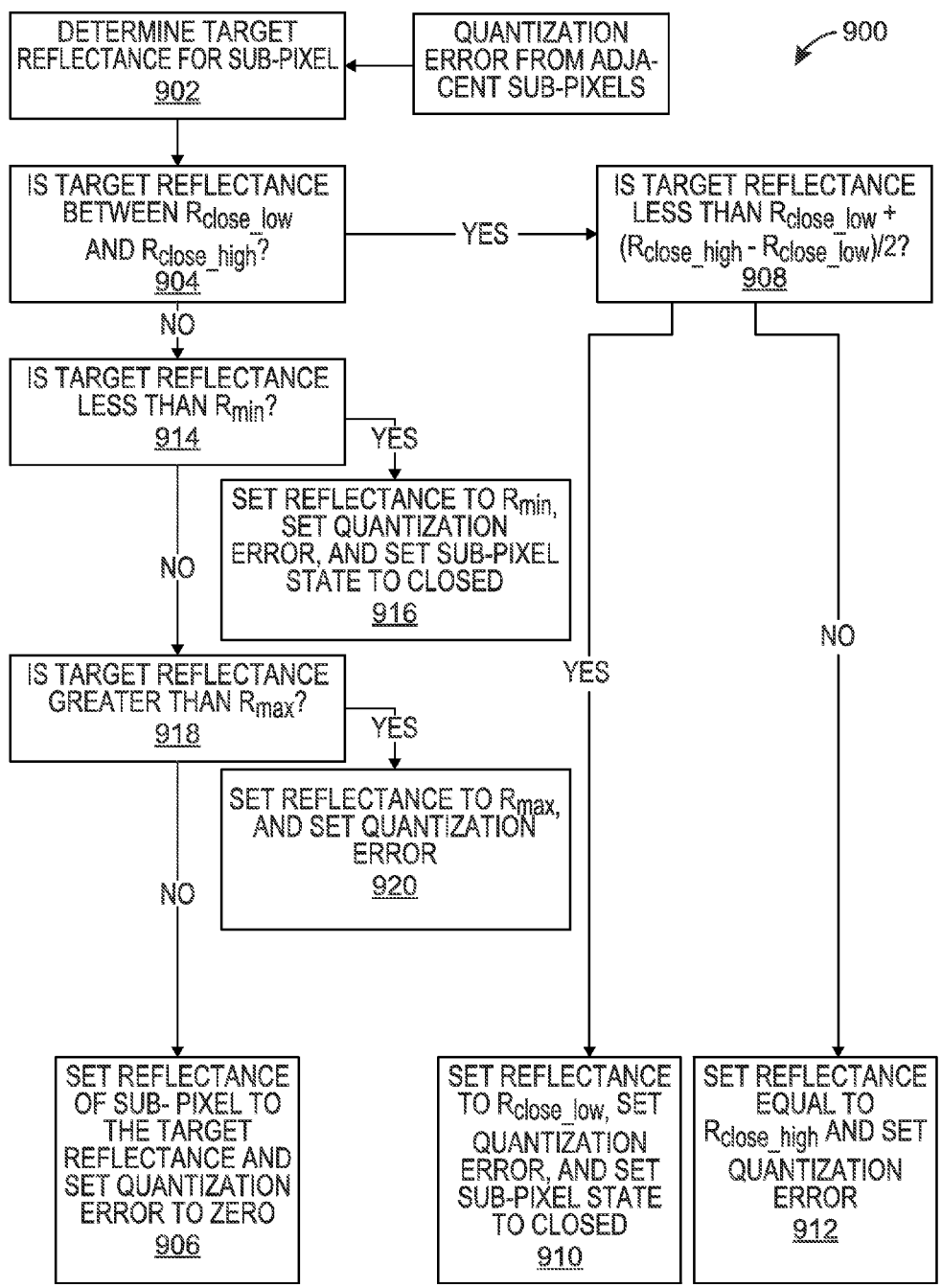
FIG. 9 is a flowchart depicting an example method for dithering reflectance values in an open electrowetting sub-pixel.

To illustrate, FIG. 9 is a flowchart showing an example method 900 that may be performed by a display controller to implement the disclosed dithering scheme. Because the dithering method controls reflectance for sub-pixels transitioning along the open-to-closed curve of FIG. 4, method 900 may only be applied to pixels that have an initial state of open. Method 900 may be implemented for each sub-pixel within a display, with the display controller implementing method 900 for a first sub-pixel in an open state and then moving to a next sub-pixel in an open state and re-executing method 900. In this manner, the display controller may iterate through each open state sub-pixel in the display, executing method 900 once for each open state sub-pixel. When method 900 has been executed for all open state sub-pixels in the display, the display controller will repeat the process again for each open state sub-pixel.

When executing method 900, the display controller can iterate through the display's open sub-pixels in any suitable manner. For example, the display controller may iterate through sub-pixels from left to right, and top to bottom. Alternatively, the display controller may iterate through each row of sub-pixels in opposite directions.

In step 902, the display controller determines a target reflectance value for the sub-pixel being analyzed. This may involve analyzing video or graphical data describing an image that should be depicted on the display. The target reflectance value may also be dependent upon a quantization error that may arise for the dithering of reflectance values of previously-analyzed sub-pixels. If, for example, the quantization error indicates that dithering resulted in a prior sub-pixel being driven with a reflectance value that is higher than desired (e.g., the quantization error is a positive value), the display controller may reduce the target reflectance value by a corresponding amount to offset that error by subtracting the quantization error from the target reflectance value.

After the target reflectance value is determined, in step 904 the target reflectance value is analyzed to determine whether the target reflectance value falls between the reflectance values $R_{close\_low}$ and $R_{close\_high}$. If not, the target reflectance value is compared to a minimum reflectance value of $R_{min}$ in step 914. If the target reflectance value is less than a value of $R_{min}$ (possibly due to an accumulation of negative reflectance quantization errors), the reflectance value of the sub-pixel is set to a minimum value $R_{min}$ (in some cases $R_{close\_low}$), the sub-pixel's state is set to closed, and the quantization error for the sub-pixel can be calculated in step 916. The quantization error can be calculated by determining the difference between the target reflectance value for the sub-pixel and the reflectance value to which the sub-pixel was actually set (i.e., $R_{min}$).

In step 918, the target reflectance value is analyzed to determine whether the target reflectance value is greater than a maximum value of $R_{max}$ in step 918. If the target reflectance value is greater than a value of $R_{max}$ (possibly due to an accumulation of reflectance quantization errors), the reflectance value of the sub-pixel is set to a maximum value $R_{max}$, and the quantization error for the sub-pixel can be calculated in step 920. The quantization error can be calculated by determining the difference between the target reflectance value for the sub-pixel and the reflectance value to which the sub-pixel was actually set (i.e., $R_{max}$).

If the target reflectance value does not fall between $R_{close\_low}$ and $R_{close\_high}$ (step 904), is not less than $R_{min}$ (step 914), and is not greater than $R_{max}$ (step 918), the sub-pixel can be set to the target reflectance value, which results in a predictable reflectance for the sub-pixel. Accordingly, in step 906, the reflectance value of the sub-pixel is set to the target reflectance value. Additionally, in various embodiments, at this time the quantization error can be set to zero because, as described above, the target reflectance value was configured to offset the input quantization error.

If, however, in step 904 it was determined that the target reflectance value falls between $R_{close\_low}$ and $R_{close\_high}$, the target reflectance value will be quantized to either $R_{close\_low}$ or $R_{close\_high}$. Accordingly, in step 908 the display controller determines whether the target reflectance value falls closer to $R_{close\_low}$ or $R_{close\_high}$. If closer to $R_{close\_low}$ (i.e., the target reflectance value is less than $R_{close\_low}+(R_{close\_high}-R_{close\_low})/2$), the sub-pixel's reflectance value is set to $R_{close\_low}$ (a reflectance value that can be reliably achieved) in step 910. At this time, the quantization error for this sub-pixel can also be set. In various embodiments, the quantization error will be determined by the difference between the target reflectance value and the reflectance value at which the sub-pixel was ultimately set (i.e., $R_{close\_low}$). Additionally, at this time the sub-pixel has been forced into a closed state. As such, the display controller can designate the sub-pixel as being in a closed state in a memory storing sub-pixel open/closed status data.

Conversely, if in step 908 the display controller determines that the target reflectance value falls closer to $R_{close\_high}$ (i.e., the target reflectance value is greater than $R_{close\_low}+(R_{close\_high}-R_{close\_low})/2$), the sub-pixel's reflectance value is set to $R_{close\_high}$ (a reflectance level that can be reliably achieved) in step 912. At this time, the quantization error for this sub-pixel can also be set. In various embodiments, the quantization error will be determined by the difference between the target reflectance value and the reflectance value at which the sub-pixel was ultimately set (i.e., $R_{close\_high}$).

With the reflectance value of the sub-pixel set, the display controller can then move on to the next open sub-pixel in the display and re-execute method 900 of FIG. 9. The quantization error calculated for the present sub-pixel in either of steps 906, 910, 912, 916, or 920 will then be used as an input in calculating the target reflectance value for the next sub-pixel.

By implementing this dithering approach, the reflectance value for individual sub-pixels can be set to values that result in predictable actual reflectance of the sub-pixels. Although an individual sub-pixel's reflectance value may include some offset or error due to the quantization of reflectance values, the reflectance values of nearby sub-pixels are adjusted to compensate. As such, the local average reflectance values in the display are managed to match those of a source image or data that is being depicted on the display.

Figure 10:
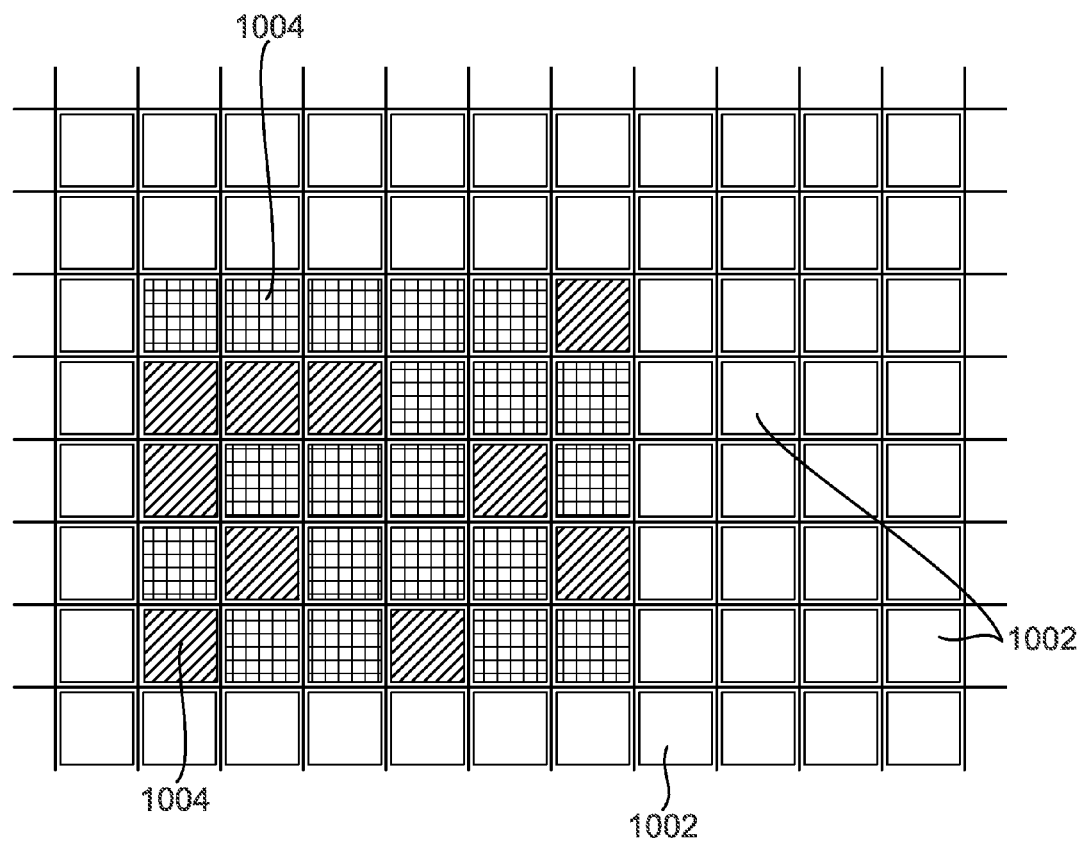
FIG. 10 depicts a plurality of electrowetting sub-pixels within a display in which reflectance values for a number of the electrowetting sub-pixels are dithered.

To illustrate, FIG. 10 depicts a number of sub-pixels within a display. The blank sub-pixels 1002 represent sub-pixels with target reflectance values that can be predictably achieved. As such, the reflectance values of sub-pixels 1002 are not dithered. The hashed sub-pixels 1004 represent sub-pixels with target reflectance values that cannot be predictably achieved (i.e., falling between $R_{close\_low}$ and $R_{close\_high}$). As such, the reflectance values of sub-pixels 1004 are dithered to either $R_{close\_low}$ or $R_{close\_high}$ (indicated by the different hash directions in FIG. 10). Taken together, the average reflectance value for the group of dithered sub-pixels 1004 will be equal to (or at least approximate) the average target reflectance value for that group of sub-pixels due the dithering algorithm discussed above.

When implementing this dithering approach, particular sub-pixels can be driven to fully closed (i.e., set to reflectance values equal to $R_{close\_low}$ and corresponding driving voltages equal to or less than $V_{close\_low}$). Once closed, the sub-pixels will no longer behave according to the open-to-closed reflectance curve.

In making the determination that a particular sub-pixel is to be closed, the display's controller (e.g., display controller 308) may evaluate a number of criteria. The first criterion may be that the sub-pixel being evaluated is currently being driven with a structural positive error, where the error exceeds a threshold. That is, the sub-pixel is being driven at a voltage resulting in the sub-pixel having a reflectance value that is greater than the target reflectance value for the sub-pixel. That may result, for example, from accumulated errors in other sub-pixels resulting from the dithering process described above. A second criterion may be whether the local average reflectance value around the sub-pixel being evaluated has a structure positive error, resulting in the local average reflectance value being greater than the target reflectance value. This error may also be compared against a threshold. Another criterion may be that the distribution of closed sub-pixels within the display should achieve a certain spatial uniformity, for a locally spatial uniform source image. Finally, another criterion may require that sub-pixels and signals representing darker image content should not contain temporal noise as this could trigger the undesirable closing of sub-pixels.

The display controller may be configured to evaluate each one of these criterion. If all criteria (or some subset of the criteria are met), the display controller can then make the determination that the sub-pixel being evaluated can be closed. The reflectance value of the sub-pixel can then be set to $R_{close\_low}$, to ensure that the sub-pixel enters a closed state.

When evaluating these criteria, the display controller may reference past frames of graphic data that were displayed on the screen in order to evaluate the desired state (e.g., open or closed) for sub-pixels in later frames. Additionally, when comparing the status of one sub-pixel to other (e.g., surrounding) sub-pixels, if error-diffusion techniques have been utilized to implement a dithering process, an error diffusion register utilized in that process may store information describing the reflectance values of surrounding sub-pixels.

Once a sub-pixel is closed, the display controller can update an entry in the memory storing sub-pixel state data to indicate that the sub-pixel has entered a closed state.

In a similar fashion to the dithering of reflectance values for open sub-pixels about their closing regime, the reflectance values for closed pixels being driven at reflectance values near their opening regime can also be dithered.

As discussed above, when a sub-pixel is operating along the closed-to-open curve of FIG. 4 (i.e., the sub-pixel is in a closed state), the sub-pixel exhibits unpredictable opening characteristics at driving voltages between $V_{open\_low}$ and $V_{open\_high}$. Accordingly, when a closed sub-pixel is to be driven at a reflectance value close to the sub-pixel's opening reflectance value, the driving regime should avoid reflectance values that correspond to driving voltages between $V_{open\_low}$ and $V_{open\_high}$ as those driving voltages result in unknown reflectance. When avoiding those driving voltages, the display controller may implement a dithering approach to achieve average reflectance values over a number of sub-pixels of between $R_{open\_low}$ and $R_{open\_high}$.

Figure 11:
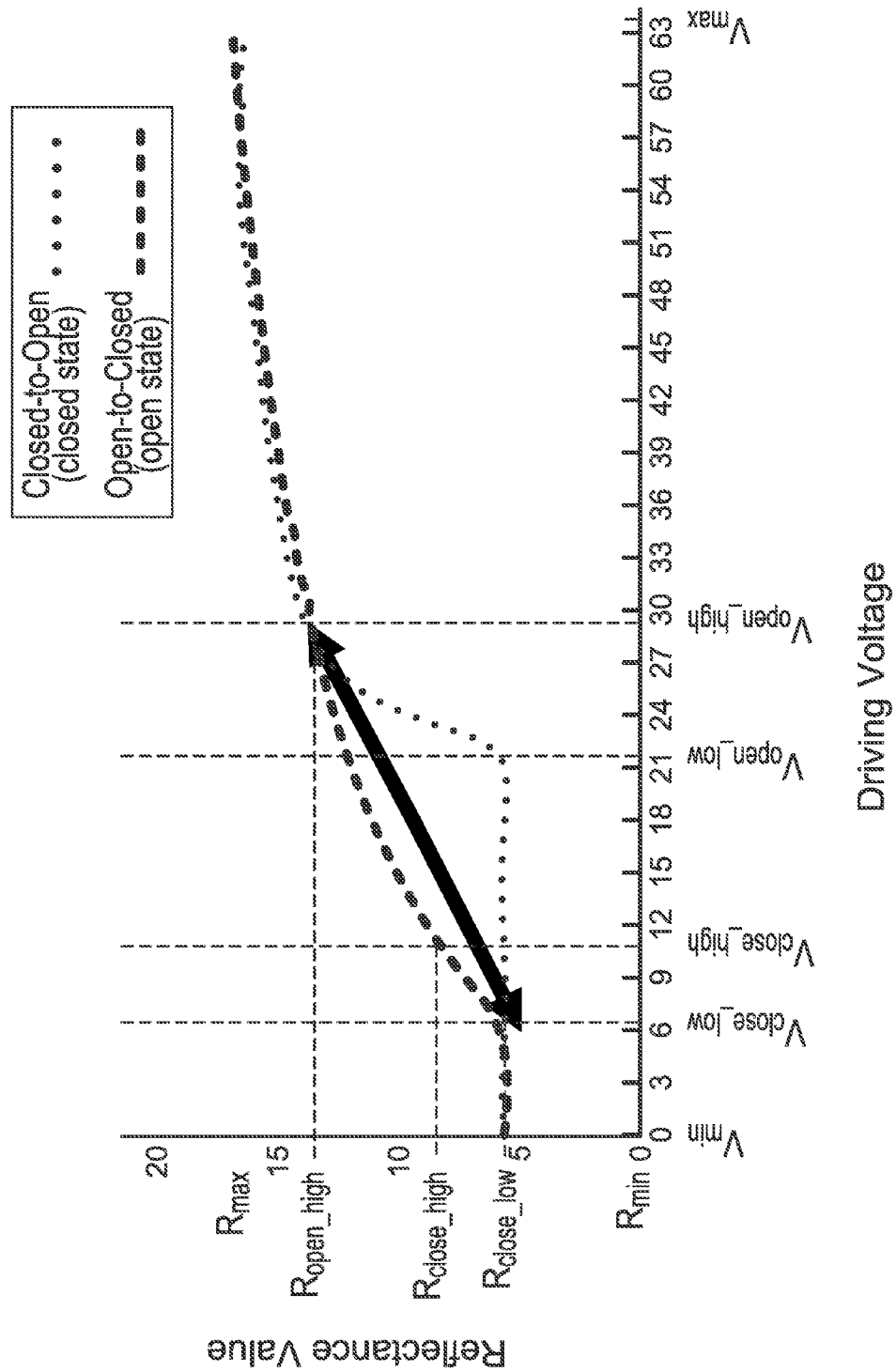
FIG. 11 depicts graphically an example method for dithering reflectance values for a closed electrowetting sub-pixel.

This dithering approach is illustrated in FIG. 11. In FIG. 11, the horizontal axis represents driving voltage, while the vertical axis represents the reflectance value of the sub-pixel. Accordingly, FIG. 11 depicts the mapping between a particular reflectance value for a sub-pixel and the corresponding driving voltage based upon the sub-pixel's current state. As discussed above, reflectance values depicted on the vertical axis will correspond, generally, to the actual reflectance of a sub-pixel set to that reflectance value.

Referring to FIG. 11, for a sub-pixel operating along the closed-to-open curve (i.e., a sub-pixel in a closed state), the sub-pixel can be driven to any reflectance value along the curve that exceeds $R_{open\_high}$. Lower reflectance values cannot be reliably achieved. Instead, when the target reflectance value for a sub-pixel is below $R_{open\_high}$, the sub-pixel will instead be driven to reflectance value that either equals a minimum reflectance value of $R_{close\_low}$ or a reflectance value of $R_{open\_high}$ or greater. The reflectance values of adjacent sub-pixels can then be adjusted to compensate. As in the case of an open sub-pixel, specific dithering approaches, such as Floyd-Steinberg dithering, may be utilized to implement this reflectance dithering approach.

In such an implementation, error diffusion may be utilized to distribute the reflectance value offset or error resulting from the dithering of reflectance value of a single sub-pixel to other sub-pixels within the display in order to achieve a target average reflectance value. This offset or error can be referred to as quantization error as it results from the quantization of a target reflectance value of a sub-pixel of a value between $R_{close\_low}$ and $R_{open\_high}$ to either $R_{close\_low}$ or $R_{open\_high}$.

Figure 12:
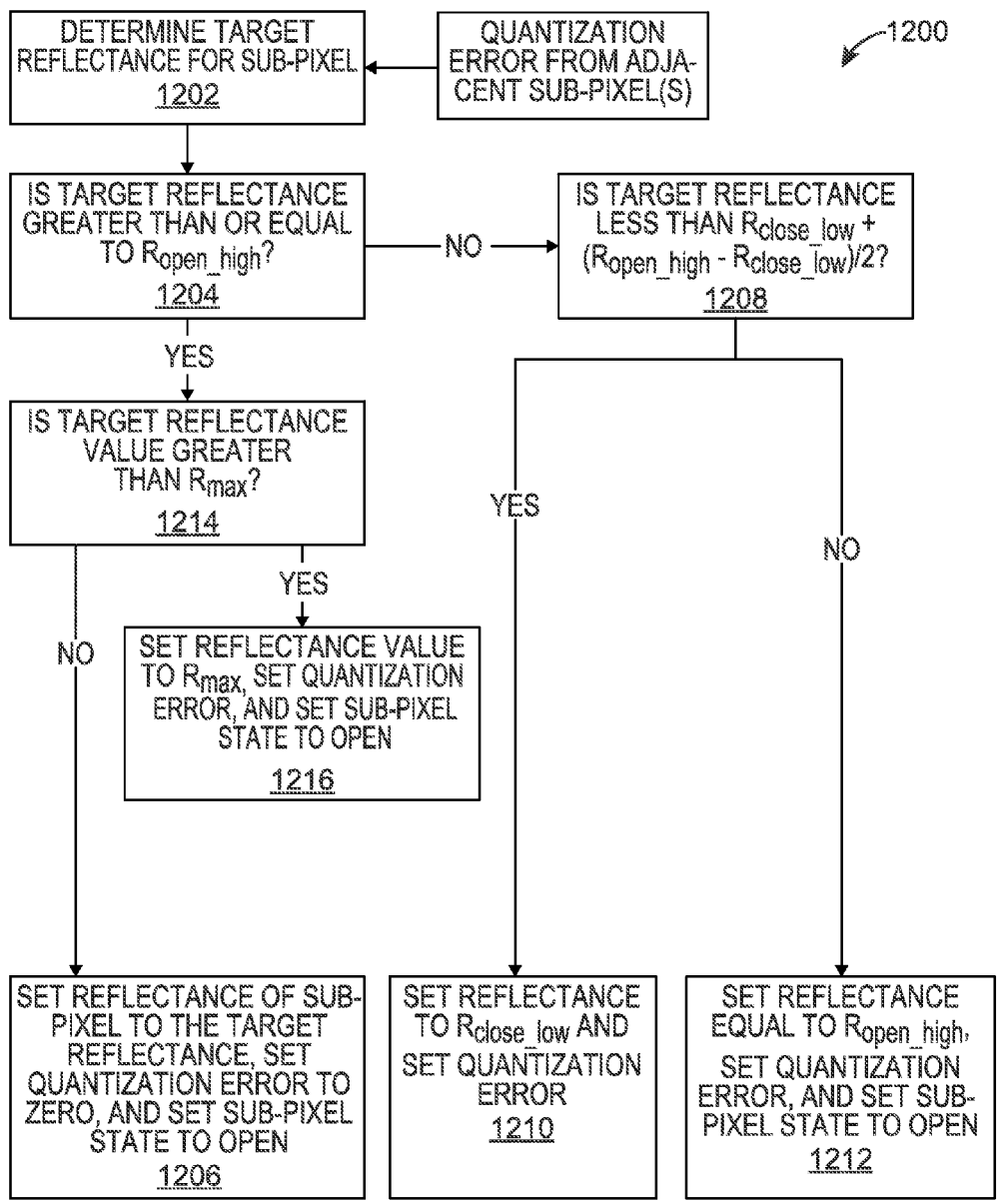
FIG. 12 is a flowchart depicting an example method for dithering reflectance values in a closed electrowetting sub-pixel.

To illustrate, FIG. 12 is a flowchart showing an example method 1200 that may be performed by a display controller to implement the disclosed dithering scheme for pixels in a closed state. Method 1200 may be implemented by the display controller in a similar manner to method 900 depicted in FIG. 9.

Referring to FIG. 12, in step 1202 the display controller determines a target reflectance value for the sub-pixel being analyzed. This may involve analyzing video or graphical data describing an image that should be depicted on the display. The target reflectance value may also be dependent upon a quantization error that may arise for the dithering of previously-analyzed sub-pixels. If, for example, the quantization error indicates that dithering resulted in a prior sub-pixel being driven with a reflectance value that is higher than was desired (e.g., the quantization error is a positive value), the display controller may reduce the target reflectance value by a corresponding amount to offset that error.

After the target reflectance value is determined, in step 1204 the target reflectance value is analyzed to determine whether the target reflectance value is greater than or equal to $R_{open\_high}$. If so, in step 1214 the target reflectance value is analyzed to determine whether the target reflectance value is greater than a maximum value of $R_{max}$. If the target reflectance value is greater than a value of $R_{max}$ (possibly due to an accumulation of reflectance quantization errors), in step 1216 the reflectance value of the sub-pixel is set to a maximum value $R_{max}$, the quantization error for the sub-pixel is calculated, and the sub-pixel is set to an open state. The quantization error can be calculated by determining the difference between the target reflectance value for the sub-pixel and the reflectance value to which the sub-pixel was actually set (i.e., $R_{max}$).

If the target reflectance value is not greater than $R_{max}$, the sub-pixel can be reliably driven to the target reflectance value. Accordingly, in step 1206, the reflectance value of the sub-pixel is set to the target reflectance value. Additionally, in various embodiments, at this time the quantization error can be set to zero because, as described above, the target reflectance value was configured to offset the input quantization error. Additionally, because the sub-pixel has reliably been driven to an open state, the display controller can designate the sub-pixel as being in an open state in a memory storing sub-pixel open/closed state data.

If, however, in step 1204 it was determined that the target reflectance value is not greater than or equal to $R_{open\_high}$, the sub-pixel's reflectance value will be quantized to either $R_{close\_low}$ or $R_{open\_high}$. Accordingly, in step 1208 the display controller determines whether the target reflectance value falls closer to $R_{close\_low}$ or $R_{open\_high}$. If closer to $R_{close\_low}$ (i.e., the target reflectance value is less than $R_{close\_low}$+$(R_{open\_high}-R_{close\_low})/2$), the target reflectance value is set to $R_{close\_low}$ (a reflectance value that can be reliably achieved) in step 1210. At this time, the quantization error for this sub-pixel can also be set. In various embodiments, the quantization error will be determined by the difference between the target reflectance value and the reflectance value at which the sub-pixel was ultimately set (i.e., $R_{close\_low}$).

Conversely, if in step 1208 the display controller determines that the target reflectance value falls closer to $R_{open\_high}$ (i.e., the target reflectance value is greater than $R_{close\_low}$+$(R_{open\_high}-R_{close\_low})/2$), the target reflectance value is set to $R_{open\_high}$ (a reflectance value that can be reliably achieved) in step 1212. At this time, the quantization error for this sub-pixel can also be set. In various embodiments, the quantization error will be determined by the difference between the target reflectance value and the reflectance value at which the sub-pixel was ultimately set (i.e., $R_{open\_high}$). Additionally, at this time the sub-pixel has been opened. As such, the display controller can designate the sub-pixel as being in an open state in a memory storing sub-pixel open/closed state data.

With the reflectance value of the sub-pixel set, the display controller can then move on to the next closed sub-pixel in the display and re-execute method 1200 of FIG. 12. The quantization error calculated for the present sub-pixel in either of steps 1206, 1210, 1212, or 1216 can then be used as an input in calculating the reflectance value for the next sub-pixel.

In various embodiments, a display controller may determine a reflectance value for all sub-pixels in a display by executing either of method 900 depicted in FIG. 9 or method 1200 depicted in FIG. 12 depending upon whether the sub-pixel was initially in an open state or a closed state.

Figure 13:
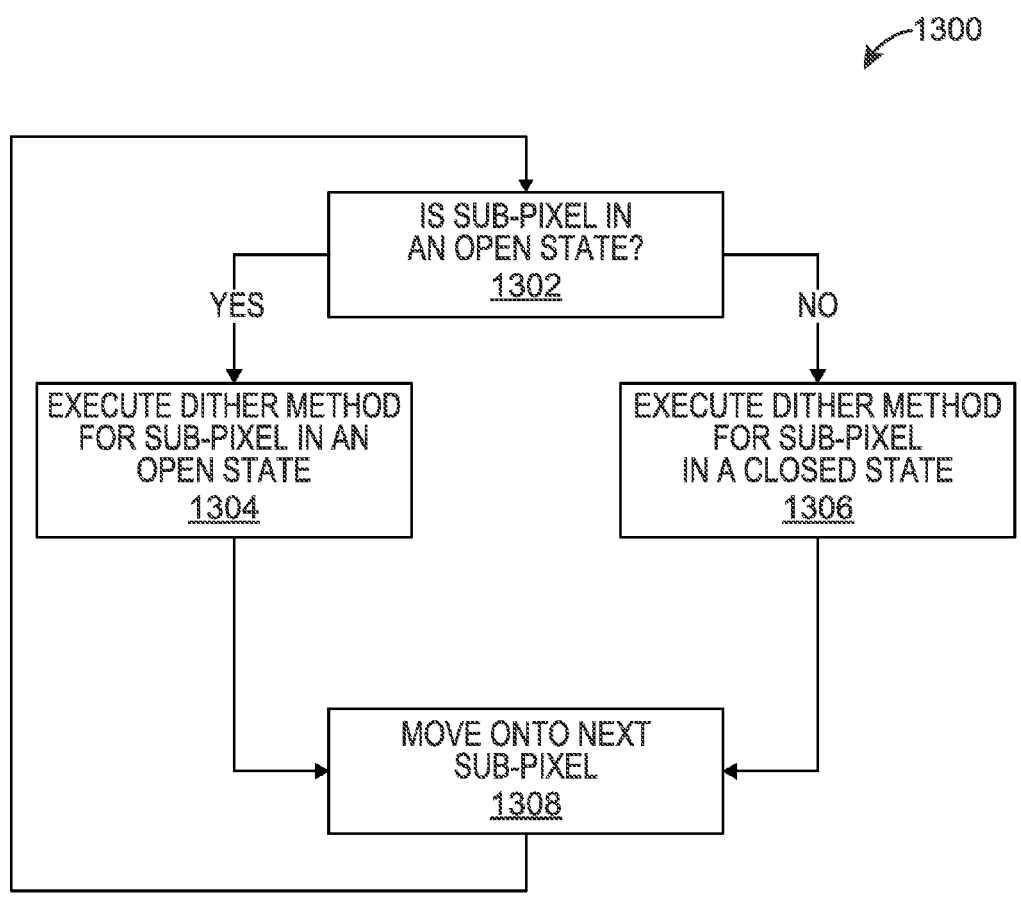
FIG. 13 is a flowchart illustrating an example method for applying by a display controller dithering techniques to electrowetting sub-pixels of a display.

FIG. 13 is a flowchart illustrating an example method 1300 for a display controller to apply the disclosed dithering techniques to sub-pixels of a display, where the dithering technique depends upon the open or closed status of each sub-pixel. Method 1300 may be implemented for each sub-pixel within a display, with the display controller implementing method 1300 for a first sub-pixel and then moving to a next sub-pixel and re-executing method 1300. In this manner, the display controller may iterate through each sub-pixel in the display, executing method 1300 once for each sub-pixel. When method 1300 has been executed for all sub-pixels in the display, the display controller can repeat the process again for each sub-pixel. Alternatively, method 1300 could be executed for each sub-pixel within a display having the same color so that quantization errors in reflectance values are distributed amongst sub-pixels of the same color. In such an embodiment, a controller may execute several instances of method 1300 for different color sub-pixels that may be present within the display.

When executing method 1300, the display controller can iterate through the display's sub-pixels in any suitable manner. For example, the display controller may iterate through sub-pixels from left to right, and top to bottom. Alternatively, the display controller may iterate through each row of sub-pixels in opposite directions.

Referring to FIG. 13, in step 1302 the display controller determines whether the sub-pixel being analyzed is in an open or closed state. The open or closed state of the sub-pixel can be determined using data retrieved from a registry or memory configured to store open or closed state information for the display's sub-pixels.

If the sub-pixel is in an open state, then in step 1304 the display controller executes a dithering algorithm for the open state sub-pixel. For example, the display controller may implement method 900 illustrated in FIG. 9. Conversely, if the sub-pixel is not in an open state (i.e., the sub-pixel is in a closed state), then in step 1306 the display controller executes a dithering algorithm for the closed state sub-pixel. For example, the display controller may implement method 1200 illustrated in FIG. 12. After either dithering method has been executed, in step 1308 the display controller moves on the next sub-pixel in the display and the method repeats.

Figure 14:
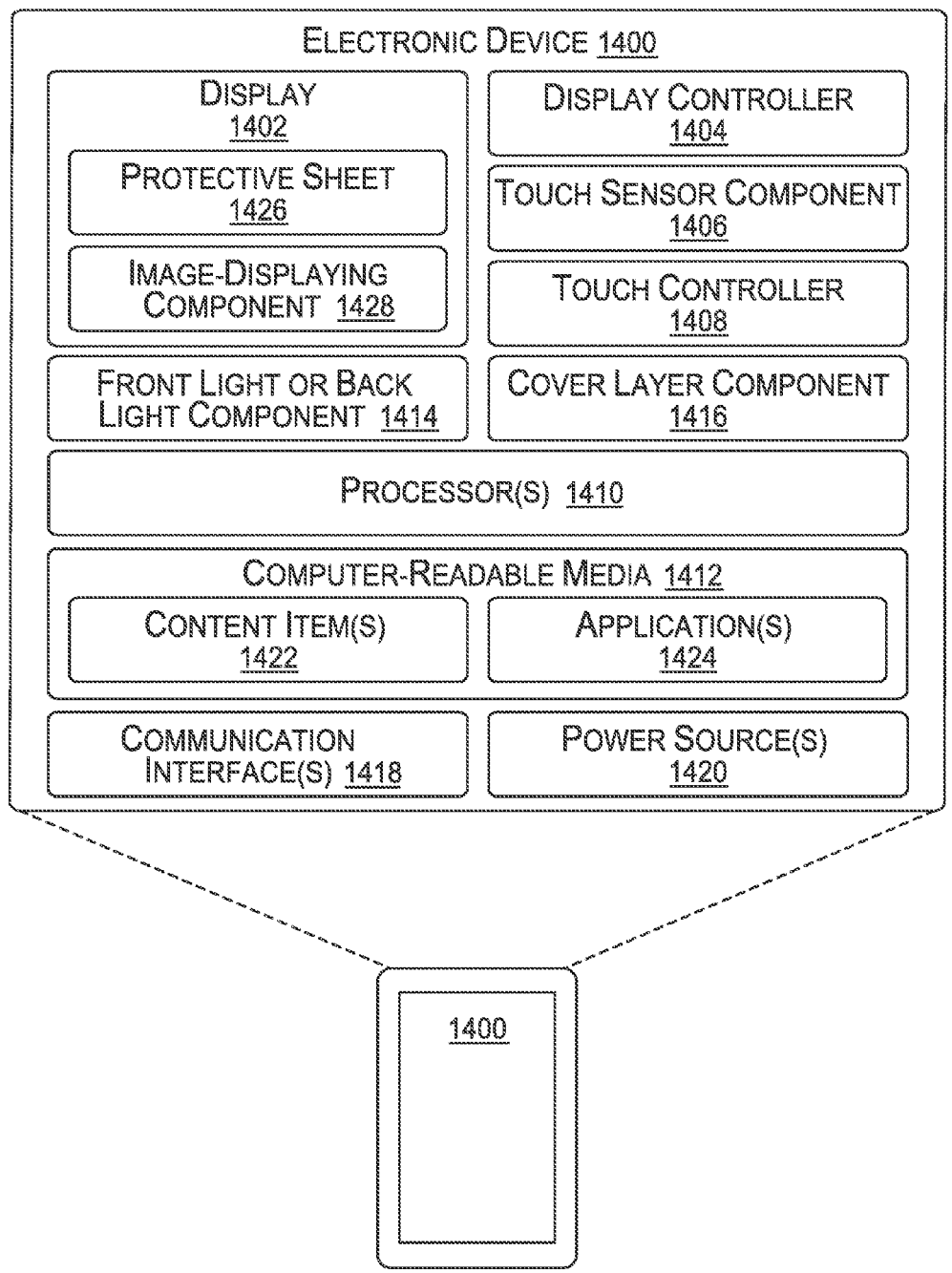
FIG. 14 illustrates an example electronic device that may incorporate a display device, according to various embodiments.

FIG. 14 illustrates an example electronic device 1400 that may incorporate any of the display devices discussed above. Electronic device 1400 may comprise any type of electronic device having a display. For instance, electronic device 1400 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1400 may be a non-mobile electronic device (e.g., a computer display or a television). In addition, while FIG. 14 illustrates several example components of electronic device 1400, it is to be appreciated that electronic device 1400 may also include other conventional components, such as an operating system, system busses, input/output components, and the like. Further, in other embodiments, such as in the case of a television or computer monitor, electronic device 1400 may only include a subset of the components illustrated.

Regardless of the specific implementation of electronic device 1400, electronic device 1400 includes a display 1402 and a corresponding display controller 1404. The display 1402 may represent a reflective or transmissive display in some instances or, alternatively, a transflective display (partially transmissive and partially reflective).

In one embodiment, display 1402 comprises an electrowetting display that employs an applied voltage to change the surface tension of a fluid in relation to a surface. For example, such an electrowetting display may include the array of sub-pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the sub-pixel, the colored oil is displaced and the sub-pixel becomes transparent. If multiple sub-pixels of the display are independently activated, display 1402 may present a color or grayscale image. The sub-pixels may form the basis for a transmissive, reflective, or transmissive/reflective (transreflective) display. Further, the sub-pixels may be responsive to high switching speeds (e.g., on the order of several milliseconds), while employing small sub-pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 1402 may represent a backlit display, examples of which are mentioned above.

In addition to including display 1402, FIG. 14 illustrates that some examples of electronic device 1400 may include a touch sensor component 1406 and a touch controller 1408. In some instances, at least one touch sensor component 1406 resides with, or is stacked on, display 1402 to form a touch-sensitive display. Thus, display 1402 may be capable of both accepting user touch input and rendering content in response to or corresponding to the touch input. As several examples, touch sensor component 1406 may comprise a capacitive touch sensor, a force sensitive resistance (FSR), an interpolating force sensitive resistance (IFSR) sensor, or any other type of touch sensor. In some instances, touch sensor component 1406 is capable of detecting touches as well as determining an amount of pressure or force of these touches.

FIG. 14 further illustrates that electronic device 1400 may include one or more processors 1410 and one or more computer-readable media 1412, as well as a front light component 1414 (which may alternatively be a backlight component in the case of a backlit display) for lighting display 1402, a cover layer component 1416, such as a cover glass or cover sheet, one or more communication interfaces 1418 and one or more power sources 1420. The communication interfaces 1418 may support both wired and wireless connection to various networks, such as cellular networks, radio, WiFi networks, short range networks (e.g., Bluetooth® technology), and infrared (IR) networks, for example.

Depending on the configuration of electronic device 1400, computer-readable media 1412 (and other computer-readable media described throughout) is an example of computer storage media and may include volatile and nonvolatile memory. Thus, computer-readable media 1412 may include, without limitation, RAM, ROM, EEPROM, flash memory, and/or other memory technology, and/or any other suitable medium that may be used to store computer-readable instructions, programs, applications, media items, and/or data which may be accessed by electronic device 1400.

Computer-readable media 1412 may be used to store any number of functional components that are executable on processor 1410, as well as content items 1422 and applications 1424. Thus, computer-readable media 1412 may include an operating system and a storage database to store one or more content items 1422, such as eBooks, audio books, songs, videos, still images, and the like. Computer-readable media 1412 of electronic device 1400 may also store one or more content presentation applications to render content items on electronic device 1400. These content presentation applications may be implemented as various applications 1424 depending upon content items 1422. For instance, the content presentation application may be an electronic book reader application for rending textual electronic books, an audio player for playing audio books or songs, or a video player for playing video.

In some instances, electronic device 1400 may couple to a cover (not illustrated in FIG. 14) to protect the display 1402 (and other components in the display stack or display assembly) of electronic device 1400. In one example, the cover may include a back flap that covers a back portion of electronic device 1400 and a front flap that covers display 1402 and the other components in the stack. Electronic device 1400 and/or the cover may include a sensor (e.g., a Hall effect sensor) to detect whether the cover is open (i.e., if the front flap is not atop display 1402 and other components). The sensor may send a signal to front light component 1414 if the cover is open and, in response, front light component 1414 may illuminate display 1402. If the cover is closed, meanwhile, front light component 1414 may receive a signal indicating that the cover has closed and, in response, front light component 1414 may turn off.

Furthermore, the amount of light emitted by front light component 1414 may vary. For instance, upon a user opening the cover, the light from the front light may gradually increase to its full illumination. In some instances, electronic device 1400 includes an ambient light sensor (not illustrated in FIG. 14) and the amount of illumination of front light component 1414 may be based at least in part on the amount of ambient light detected by the ambient light sensor. For example, front light component 1414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1402 may vary depending on whether front light component 1414 is on or off, or based on the amount of light provided by front light component 1414. For instance, electronic device 1400 may implement a larger default font or a greater contrast when the light is off compared to when the light is on. In some embodiments, electronic device 1400 maintains, if the light is on, a contrast ratio for display 1402 that is within a certain defined percentage of the contrast ratio if the light is off.

As described above, touch sensor component 1406 may comprise a capacitive touch sensor that resides atop display 1402. In some examples, touch sensor component 1406 may be formed on or integrated with cover layer component 1416. In other examples, touch sensor component 1406 may be a separate component in the stack of the display assembly. Front light component 1414 may reside atop or below touch sensor component 1406. In some instances, either touch sensor component 1406 or front light component 1414 is coupled to a top surface of a protective sheet 1426 of display 1402. As one example, front light component 1414 may include a lightguide sheet and a light source (not illustrated in FIG. 14). The lightguide sheet may comprise a substrate (e.g., a transparent thermoplastic such as PMMA or other acrylic), a layer of lacquer and multiple grating elements formed in the layer of lacquer that function to propagate light from the light source towards display 1402; thus, illuminating display 1402.

Cover layer component 1416 may include a transparent substrate or sheet having an outer layer that functions to reduce at least one of glare or reflection of ambient light incident on electronic device 1400. In some instances, cover layer component 1416 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, protective sheet 1426 may include a similar UV-cured hard coating on the outer surface. Cover layer component 1416 may couple to another component or to protective sheet 1426 of display 1402. Cover layer component 1416 may, in some instances, also include a UV filter, a UV-absorbing dye, or the like, for protecting components lower in the stack from UV light incident on electronic device 1400. In still other examples, cover layer component 1416 may include a sheet of high-strength glass having an antiglare and/or antireflective coating.

Display 1402 includes protective sheet 1426 overlying an image-displaying component 1428. For example, display 1402 may be preassembled to have protective sheet 1426 as an outer surface on the upper or image-viewing side of display 1402. Accordingly, protective sheet 1426 may be integral with and may overlay image-displaying component 1428. Protective sheet 1426 may be optically transparent to enable a user to view, through protective sheet 1426, an image presented on image-displaying component 1428 of display 1402.

In some examples, protective sheet 1426 may be a transparent polymer film in the range of 25 to 200 micrometers in thickness. As several examples, protective sheet 1426 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1426 may include a coating, such as the hard coating described above. For instance, the hard coating may be applied to the outer surface of protective sheet 1426 before or after assembly of protective sheet 1426 with image-displaying component 1428 of display 1402. In some examples, the hard coating may include a photoinitiator or other reactive species in its composition, such as for curing the hard coating on protective sheet 1426. Furthermore, in some examples, protective sheet 1426 may be dyed with a UV-light-absorbing dye, or may be treated with other UV-absorbing treatment. For example, protective sheet 1426 may be treated to have a specified UV cutoff such that UV light below a cutoff or threshold wavelength is at least partially absorbed by protective sheet 1426, thereby protecting image-displaying component 1428 from UV light.

According to some embodiments herein, one or more of the components discussed above may be coupled to display 1402 using fluid optically-clear adhesive (LOCA). For example, the lightguide portion of front light component 1414 may be coupled to display 1402 by placing LOCA on the outer or upper surface of protective sheet 1426. If the LOCA reaches the corner(s) and/or at least a portion of the perimeter of protective sheet 1426, UV-curing may be performed on the LOCA at the corners and/or the portion of the perimeter. Thereafter, the remaining LOCA may be UV-cured and front light component 1414 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1414. In other embodiments, the LOCA may be placed near a center of protective sheet 1426, and pressed outwards towards a perimeter of the top surface of protective sheet 1426 by placing front light component 1414 on top of the LOCA. The LOCA may then be cured by directing UV light through front light component 1414. As discussed above, and as discussed additionally below, various techniques, such as surface treatment of the protective sheet, may be used to prevent discoloration of the LOCA and/or protective sheet 1426.

While FIG. 14 illustrates a few example components, electronic device 1400 may have additional features or functionality. For example, electronic device 1400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1400 may reside remotely from electronic device 1400 in some implementations. In these implementations, electronic device 1400 may utilize communication interfaces 1418 to communicate with and utilize this functionality.

In an embodiment, a method of driving an electrowetting display device including a plurality of sub-pixels includes determining a target reflectance value for a sub-pixel in the plurality of sub-pixels, determining a first reflectance value of the sub-pixel, and comparing the first reflectance value and the target reflectance value to a threshold value. When the first reflectance value of the sub-pixel is less than the threshold value and the target reflectance value is less than the threshold value, the method includes setting a reflectance value of the sub-pixel to a second reflectance value greater than or equal to the threshold value, and setting the reflectance value of the sub-pixel to the target reflectance value. When the first reflectance value is greater than or equal to the threshold value or the target reflectance value is greater than or equal to the threshold value, the method includes setting the reflectance value of the sub-pixel to the target reflectance value without setting the reflectance value of the sub-pixel to the second reflectance value.

In one embodiment, a method of driving an electrowetting display device including a plurality of sub-pixels includes determining a target reflectance value for a sub-pixel in the plurality of sub-pixels. The method includes setting a reflectance value of the sub-pixel to the target reflectance value by setting the reflectance value of the sub-pixel to a first reflectance value greater than a threshold value, and setting the reflectance value of the sub-pixel to the target reflectance value.

In one embodiment, a display device includes a sub-pixel including a plurality of sub-pixel walls defining a cavity, and a first fluid and a second fluid within the cavity, the first fluid being immiscible with the second fluid. The display device includes a display controller including an input line for receiving data relating to a target reflectance value of the sub-pixel, and an output line for providing at least one display signal level for applying a voltage to a first electrode in the sub-pixel to provide a driving voltage for the sub-pixel. The display controller is configured to determine a target reflectance value for the sub-pixel, and set a reflectance value of the sub-pixel to the target reflectance value by setting the reflectance value of the sub-pixel to a first reflectance value greater than a threshold value, and setting the reflectance value of the sub-pixel to the target reflectance value.

In one embodiment, a method of driving an electrowetting display device including a plurality of sub-pixels includes determining whether a sub-pixel in the plurality of sub-pixels is in an open state or a closed state, determining a target reflectance value for the sub-pixel, and, for the sub-pixel in the open state, determining that the target reflectance value is less than a first threshold value, and setting a reflectance value of the sub-pixel to either a minimum reflectance value or the first threshold value. The method includes, for the sub-pixel in the closed state, determining that the target reflectance value is less than a second threshold value, and setting the reflectance of the sub-pixel to either the minimum reflectance value or the second threshold value.

In one embodiment, a method of driving an electrowetting display device including a plurality of sub-pixels includes determining whether a sub-pixel in the plurality of sub-pixels is in an open state or a closed state, determining a target reflectance value for the sub-pixel, and setting a reflectance value of the sub-pixel based upon whether the sub-pixel is in the open state or the closed state and the target reflectance value.

In one embodiment, a display device includes a sub-pixel including a plurality of sub-pixel walls defining a cavity, and a first fluid and a second fluid within the cavity, the first fluid being immiscible with the second fluid. The display device includes a display controller including an input line for receiving data relating to a target reflectance of the sub-pixel, and an output line for providing at least one display signal level for applying a voltage to a first electrode in the sub-pixel to establish a driving voltage for the sub-pixel. The display controller is configured to determine whether the sub-pixel is in an open state or a closed state, determine a target reflectance value for the sub-pixel, and set a reflectance value of the sub-pixel based upon whether the sub-pixel is in the open state or the closed state and the target reflectance value.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A method of driving an electrowetting display device including a plurality of sub-pixels, the method comprising:
   determining whether a sub-pixel in the plurality of sub-pixels is in an open state or a closed state;
   determining a target reflectance value for the sub-pixel;
   for the sub-pixel in the open state:
      determining that the target reflectance value is less than a first threshold value, the first threshold value being a value less than a maximum reflectance value and greater than a minimum reflectance value; and
      setting a reflectance value of the sub-pixel to the minimum reflectance value or the first threshold value; and
   for the sub-pixel in the closed state:
      determining that the target reflectance value is less than a second threshold value, the second threshold value being a value greater than the first threshold value, and
      setting the reflectance value of the sub-pixel to either the minimum reflectance value or the second threshold value.

2. The method of claim 1, wherein the first threshold value is a highest reflectance value that causes the sub-pixel to be in a closed state when the reflectance value of the sub-pixel is set to the first threshold value and wherein the second threshold value is a lowest reflectance value that causes the sub-pixel to be in an open state when the reflectance value of the sub-pixel is set to the threshold value.

3. The method of claim 1, further comprising, after setting the reflectance value of the sub-pixel, calculating a quantization error by determining a difference between the reflectance value of the sub-pixel and the target reflectance value.

4. The method of claim 3, further comprising:
   determining a second target reflectance value for an adjacent second sub-pixel of the plurality of sub-pixels; and
   modifying the second target reflectance value for the adjacent second sub-pixel by increasing or decreasing the second target reflectance value of the adjacent second sub-pixel by an amount dependent upon the quantization error.

5. A method of driving an electrowetting display device including a plurality of sub-pixels, the method comprising:
   determining whether a sub-pixel in the plurality of sub-pixels is in an open state or a closed state;
   determining a target reflectance value for the sub-pixel; and
   setting a set reflectance value of the sub-pixel based upon whether the sub-pixel is in the open state or the closed state and the target reflectance value, wherein the set reflectance value is a different value from the target reflectance value.

6. The method of claim 5, including, for the sub-pixel in the open state:
   determining that the target reflectance value is less than a first threshold value, the first threshold value being less than a maximum reflectance value; and
   setting the set reflectance value of the sub-pixel to either a minimum reflectance value or the first threshold value.

7. The method of claim 6, further comprising setting the first threshold value to a highest reflectance value that causes the sub-pixel to be in a closed state when the reflectance value of the sub-pixel is set to the first threshold value.

8. The method of claim 6, wherein setting the set reflectance value of the sub-pixel to either the minimum reflectance value or the first threshold value includes:
   comparing the target reflectance value to the minimum reflectance value and the first threshold value; and
   setting the reflectance value of the sub-pixel to the first threshold value when the target reflectance value is closer to the first threshold value than the minimum reflectance value.

9. The method of claim 5, including, for the sub-pixel in the closed state:
   determining that the target reflectance value is less than a second threshold value, and setting the set reflectance of the sub-pixel to either a minimum reflectance value or the second threshold value.

10. The method of claim 9, wherein the second threshold value is a lowest reflectance value that causes the sub-pixel to be in an open state when the set reflectance value of the sub-pixel is set to the second threshold value.

11. The method of claim 9, wherein setting the set reflectance of the sub-pixel to either a minimum reflectance value or the second threshold value includes setting the set reflectance value of the sub-pixel to the minimum reflectance value when the target reflectance value is closer to the minimum reflectance value than the second threshold value.

12. The method of claim 5, further comprising, after setting the set reflectance value of the sub-pixel, calculating a quantization error by determining a difference between the set reflectance value of the sub-pixel and the target reflectance value.

13. The method of claim 12, further comprising:
determining a second target reflectance value for an adjacent second sub-pixel of the plurality of sub-pixels; and
modifying the second target reflectance value for the adjacent second sub-pixel by increasing or decreasing the second target reflectance value for the adjacent second sub-pixel by an amount dependent upon the quantization error.

14. A display device, comprising:
a sub-pixel including:
a plurality of sub-pixel walls defining a cavity, and
a first fluid and a second fluid within the cavity, the first fluid being immiscible with the second fluid; and
a display controller including:
an input line for receiving data relating to a target reflectance of the sub-pixel; and
an output line for providing at least one display signal level for applying a voltage to a first electrode in the sub-pixel to establish a driving voltage for the sub-pixel,
wherein the display controller is configured to:
determine whether the sub-pixel is in an open state or a closed state;
determine a target reflectance value for the sub-pixel; and
set a set reflectance value of the sub-pixel based upon whether the sub-pixel is in the open state or the closed state and the target reflectance value, wherein the set reflectance value is a different value from the target reflectance value.

15. The display device of claim 14, wherein the controller is configured to, for the sub-pixel in the open state:
determine that the target reflectance value is less than a first threshold value, the first threshold value being less than a maximum reflectance value; and
set the set reflectance value of the sub-pixel to either a minimum reflectance value or the first threshold value.

16. The display device of claim 15, wherein the first threshold value is a highest reflectance value that causes the sub-pixel to be in a closed state when the reflectance value of the sub-pixel is set to the first threshold value.

17. The display device of claim 14, wherein the controller is configured to, for the sub-pixel in the closed state:
determine that the target reflectance value is less than a second threshold value; and
set the set reflectance of the sub-pixel to either a minimum reflectance value or the second threshold value.

18. The display device of claim 17, wherein the second threshold value is a lowest reflectance value that causes the sub-pixel to be in an open state when the set reflectance value of the sub-pixel is set to the second threshold value.

19. The display device of claim 14, wherein the controller is configured to, after setting the set reflectance value of the sub-pixel, calculate a quantization error by determining a difference between the set reflectance value of the sub-pixel and the target reflectance value.

20. The display device of claim 19, wherein the controller is configured to:
determine a second target reflectance value for an adjacent second sub-pixel of the plurality of sub-pixels; and
modify the second target reflectance value for the adjacent second sub-pixel by increasing or decreasing the second target reflectance value for the adjacent second sub-pixel by an amount dependent upon the quantization error.

* * * * *